US012784306B2

(12) United States Patent
Yoon et al.

(10) Patent No.: US 12,784,306 B2
(45) Date of Patent: Nov. 3, 2026

(54) ELECTRONIC DEVICE FOR SYNTHESIZING IMAGE OBTAINED FROM CAMERA AND METHOD THEREOF

(71) Applicant: Samsung Electronics Co., Ltd., Suwon-si (KR)

(72) Inventors: Haeun Yoon, Suwon-si (KR); Sungoh Kim, Suwon-si (KR); Jihyun Kim, Suwon-si (KR); Donghyun Yeom, Suwon-si (KR); Sanghun Lee, Suwon-si (KR); Hyungsok Yeo, Suwon-si (KR); Seonho Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 18/781,119

(22) Filed: Jul. 23, 2024

(65) Prior Publication Data

US 2025/0086916 A1 Mar. 13, 2025

Related U.S. Application Data

(63) Continuation of application No. PCT/KR2024/010284, filed on Jul. 17, 2024.

(30) Foreign Application Priority Data

Sep. 8, 2023 (KR) ........................ 10-2023-0119500
Dec. 18, 2023 (KR) ........................ 10-2023-0185238

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/013* (2013.01); *G06T 7/70* (2017.01); *G06T 17/20* (2013.01);
(Continued)

(58) Field of Classification Search
None
See application file for complete search history.

(56) References Cited

U.S. PATENT DOCUMENTS 7,936,519 B2 5/2011 Mukawa et al.
9,001,030 B2 4/2015 Raffle et al.
(Continued)

FOREIGN PATENT DOCUMENTS

JP 4674634 B2 4/2011
JP 2012-159681 A 8/2012
(Continued)

OTHER PUBLICATIONS

International Search Report with English translation and Written Opinion dated Oct. 24, 2024; International Appln. No. PCT/KR2024/010284.

*Primary Examiner* — Robert J Craddock
(74) *Attorney, Agent, or Firm* — Jefferson IP Law, LLP

(57) ABSTRACT

A processor of a head-mounted display (HMD) device according to an embodiment controls a camera to obtain a first image of the outside of the HMD device. The processor detects a portion of the first image corresponding to an external HMD device. The processor receives information with respect to a body part covered by the external HMD device from the external HMD device through a communication circuit. The processor obtains a second image representing the body part by performing rendering on the body part based on the information. The processor displays the second image positioned in the portion of the first image and
(Continued)

a composite image including the first image through at least one display.

20 Claims, 16 Drawing Sheets

(51) Int. Cl.

| | |
|---|---|
| ***G06T 7/70*** | (2017.01) |
| ***G06T 17/20*** | (2006.01) |
| ***H04N 23/61*** | (2023.01) |

(52) U.S. Cl.

CPC ... *H04N 23/61* (2023.01); *G06T 2207/20084* (2013.01); *G06T 2207/30201* (2013.01); *G06T 2219/024* (2013.01); *G06T 2219/2004* (2013.01)

(56) References Cited

U.S. PATENT DOCUMENTS

| | | | | |
|---|---|---|---|---|
| 9,865,089 | B2 | 1/2018 | Burns et al. | |
| 9,959,678 | B2 | 5/2018 | Katz et al. | |
| 10,657,701 | B2 | 5/2020 | Osman et al. | |
| 10,852,556 | B1 | 12/2020 | Ouderkirk | |
| 10,955,914 | B2 | 3/2021 | Burns et al. | |
| 11,200,745 | B2 | 12/2021 | Johnson et al. | |
| 11,442,280 | B2 | 9/2022 | Mccracken et al. | |
| 11,861,255 | B1 | 1/2024 | Ive et al. | |
| 11,989,842 | B2 | 5/2024 | Lohr et al. | |
| 12,159,351 | B2 * | 12/2024 | Cadet | G06T 17/20 |
| 2017/0287215 | A1 | 10/2017 | Lalonde et al. | |
| 2018/0004478 | A1 * | 1/2018 | Chen | A63F 13/26 |
| 2018/0292980 | A1 | 10/2018 | Noro et al. | |
| 2019/0012528 | A1 | 1/2019 | Wilson et al. | |
| 2023/0333595 | A1 | 10/2023 | Hatfield et al. | |

FOREIGN PATENT DOCUMENTS

| | | | |
|---|---|---|---|
| JP | 2019-522856 | A | 8/2019 |
| JP | 6669901 | B2 | 3/2020 |
| JP | 2022-083918 | A | 6/2022 |
| JP | 2022-530012 | A | 6/2022 |
| JP | 2023-511807 | A | 3/2023 |
| KR | 10-2017-0036704 | A | 4/2017 |
| KR | 10-2018-0102171 | A | 9/2018 |
| KR | 10-2018-0102591 | A | 9/2018 |
| KR | 10-2259103 | B1 | 6/2021 |
| KR | 10-2021-0102964 | A | 8/2021 |
| KR | 10-2466576 | B1 | 11/2022 |
| KR | 10-2022-0162307 | A | 12/2022 |

* cited by examiner

ELECTRONIC DEVICE FOR SYNTHESIZING IMAGE OBTAINED FROM CAMERA AND METHOD THEREOF

CROSS-REFERENCE TO RELATED APPLICATION(S)

This application is a continuation application, claiming priority under § 365(c), of an International application No. PCT/KR2024/010284, filed on Jul. 17, 2024, which is based on and claims the benefit of a Korean patent application number 10-2023-0119500, filed on Sep. 8, 2023, in the Korean Intellectual Property Office, and of a Korean patent application number 10-2023-0185238, filed on Dec. 18, 2023, in the Korean Intellectual Property Office, the disclosure of each of which is incorporated by reference herein in its entirety.

TECHNICAL FIELD

The disclosure relates to an electronic device (e.g., a head-mounted display (HMD) device) for synthesizing an image obtained from a camera and method thereof.

BACKGROUND ART

In order to provide an enhanced user experience, an electronic device that provide an augmented reality (AR) service that displays information generated by a computer in association with an external object in the real-world is being developed. The electronic device may be a wearable device that may be worn by a user. For example, the electronic device may be AR glasses and/or a head-mounted display (HMD) device.

The above information is presented as background information only to assist with an understanding of the disclosure. No determination has been made, and no assertion is made, as to whether any of the above might be applicable as a prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide an electronic device (e.g., a head-mounted display (HMD) device) for synthesizing an image obtained from a camera and method thereof.

Additional aspects will be set forth in part in the description which follows and, in part, will be apparent from the description, or may be learned by practice of the presented embodiments.

In accordance with an aspect of the disclosure, a head-mounted display (HMD) device is provided. The HMD device may include a camera, a communication circuit, at least one display, memory storing one or more computer programs, and one or more processors communicatively coupled to the camera, the communication circuit, the at least one display, and the memory. The one or more computer programs include computer-executable instructions that, when executed by the one or more processors individually or collectively, cause the HMD device to control the camera to obtain a first image outside of the front direction of the HMD device. The one or more computer programs may include computer-executable instructions that, when executed by the one or more processors individually or collectively, cause the HMD device to detect a portion of the first image corresponding to an external HMD device. The one or more computer programs may include computer-executable instructions that, when executed by the one or more processors individually or collectively, cause the HMD device to receive, from the external HMD device through the communication circuit, information with respect to a body part covered by the external HMD device. The one or more computer programs may include computer-executable instructions that, when executed by the one or more processors individually or collectively, cause the HMD device to obtain, by performing a rendering with respect to the body part based on the information, a second image representing the body part. The one or more computer programs may include computer-executable instructions that, when executed by the one or more processors individually or collectively, cause the HMD device to display, via the at least one display, a composite image including the first image and the second image, wherein the second image is positioned at the portion of the first image.

In accordance with another aspect of the disclosure, a method performed by a head-mounted display (HMD) device including a camera, a communication circuit, at least one display and one or more processors is provided. The method may comprise controlling, by the HMD device, the camera to obtain a first image outside of the HMD device. The method may comprise detecting, by the HMD device, a portion of the first image corresponding to an external HMD device. The method may comprise receiving, by the HMD device, from the external HMD device through the communication circuit, information with respect to a body part covered by the external HMD device. The method may comprise obtaining, by the HMD device, by performing a rendering with respect to the body part based on the information, a second image representing the body part. The method may comprise displaying, by the HMD device, via the at least one display, a composite image including the first image and the second image, wherein the second image is positioned on the portion of the first image.

In accordance with another aspect of the disclosure, an electronic device is provided. The electronic device may comprise a camera, a communication circuit, at least one display, memory storing one or more computer programs, and one or more processors communicatively coupled to the camera, the communication circuit, the at least one display, and the memory. The one or more computer programs may include computer-executable instructions that, when executed by the one or more processors individually or collectively, cause the electronic device to detect, in a video obtained through the camera, a portion corresponding to a head-mounted display (HMD) device. The one or more computer programs may include computer-executable instructions that, when executed by the one or more processors individually or collectively, cause the electronic device to obtain, based on information received from the HMD device through the communication circuit, a virtual object representing a body part covered by the HMD device. The one or more computer programs may include computer-executable instructions that, when executed by the one or more processors individually or collectively, cause the electronic device to, display, while displaying the video on the at least one display, at least portion of the virtual object on at least portion of the at least one display where the detected portion is displayed.

In accordance with another aspect of the disclosure, a method of an electronic device including a camera, a communication circuit, at least one display and one or more processors is provided. The method may comprise detecting, by the electronic device, in a video obtained through the camera, a portion corresponding to a head-mounted display (HMD) device. The method may comprise obtaining, by the electronic device, based on information received from the HMD device through the communication circuit, a virtual object representing a body part covered by the HMD device. The method may comprise displaying, by the electronic device, while displaying the video on the at least one display, at least portion of the virtual object on at least portion of the at least one display where the detected portion is displayed.

In accordance with another aspect of the disclosure, one or more non-transitory computer-readable storage media storing one or more computer programs including computer-executable instructions that, when executed by one or more processors of a head-mounted display (HMD) device individually or collectively, cause the HMD device to perform operations are provided. The operations may include controlling, by the HMD device, a camera of the HMD device to obtain a first image outside of the HMD device, detecting, by the HMD device, a portion of the first image corresponding to an external HMD device, receiving, by the HMD device, from the external HMD device through a communication circuit of the HMD device, information with respect to a body part covered by the external HMD device, obtaining, by the HMD device, by performing a rendering with respect to the body part based on the information, a second image representing the body part, and displaying, by the HMD device, via at least one display of the HMD device, a composite image including the first image and the second image, wherein the second image is positioned on the portion of the first image.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

Figure 1:
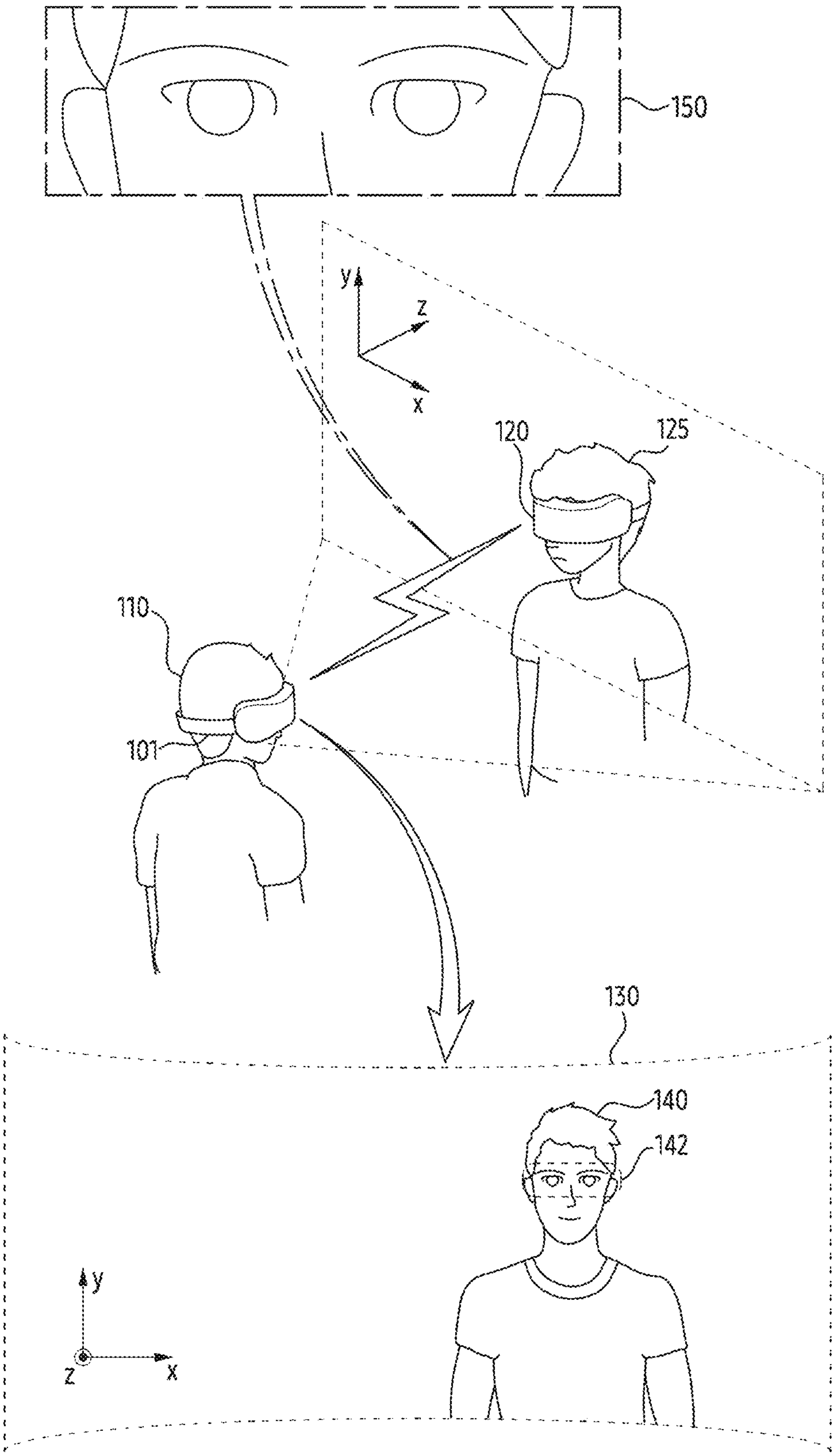
FIG. 1 illustrates an example of a screen displayed by a head-mounted display (HMD) device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments of the document and terms used herein are not intended to limit the technology described in the document to specific embodiments, and should be understood to include various modifications, equivalents, or substitutes of the corresponding embodiment. In relation to the description of the drawings, a reference numeral may be used for a similar component. In the document, an expression such as "A or B", "at least one of A and/or B", "A, B or C", or "at least one of A, B and/or C", and the like may include all possible combinations of items listed together. Expressions such as "1st", "2nd", "first" or "second", and the like may modify the corresponding components regardless of order or importance, is only used to distinguish one component from another component, but does not limit the corresponding components. When a (e.g., first) component is referred to as "connected (functionally or communicatively)" or "accessed" to another (e.g., second) component, the component may be directly connected to the other component or may be connected through another component (e.g., a third component).

The term "module" used in the document may include a unit configured with hardware, software, or firmware, and may be used interchangeably with terms such as logic, logic block, component, or circuit, and the like, for example. The module may be an integrally configured component or a minimum unit or part thereof that performs one or more functions. For example, a module may be configured with an application-specific integrated circuit (ASIC).

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 illustrates an example of a screen 130 displayed by an electronic device (e.g., a head-mounted display (HMD) device) 101 according to an embodiment of the disclosure.

The electronic device 101 may include a head-mounted display (HMD) that is wearable on a user 110's head. The electronic device 101 may be referred to as the wearable device, a head-mounted device (HMD) (or HMD device), a headgear electronic device, a glasses-type (or goggle-type) electronic device, a video see-through or visible see-through (VST) device, an extended reality (XR) device, a virtual reality (VR) device, and/or an augmented reality (AR) device. Although appearance of the electronic device 101 having a form of glasses is illustrated, the embodiment is not limited thereto. An example of a hardware configuration included in the electronic device 101 will be exemplarily described with reference to FIGS. 2A and 2B. An example of the structure of the electronic device 101 wearable on the user 110's head will be described with reference to FIGS. 8A, 8B, 9A, and/or 9B. The electronic device 101 may be referred to as an electronic device. For example, the electronic device may include an accessory (e.g., a strap) for being attached to the user 110's head.

According to an embodiment, the electronic device 101 may execute a function related to augmented reality (AR) and/or mixed reality (MR). For example, in a state in which the user 110 wears the electronic device 101, the electronic device 101 may include at least one lens disposed adjacent to the user's eyes. The electronic device 101 may combine light emitted from a display of the electronic device 101 with ambient light passing through a lens. A displaying area of the display may be formed in the lens through which the ambient light passes. Since the electronic device 101 combines the ambient light and the light emitted from the display, the user 110 may see an image in which a real object recognized by the ambient light and a virtual object formed by the light emitted from the display are mixed. The augmented reality, the mixed reality, and/or the virtual reality described above may be referred to as extended reality (XR).

According to an embodiment, the electronic device 101 may execute a function related to the video see-through or visible see-through (VST) and/or the virtual reality (VR). For example, in the state in which the user 110 wears the electronic device 101, the electronic device 101 may include a housing covering the user 110's eyes. The electronic device 101 may include a display disposed on a first surface of the housing facing the eye in the state. The electronic device 101 may include a camera disposed on a second surface opposite to the first surface. Using the camera, the electronic device 101 may obtain an image and/or video representing the ambient light. The electronic device 101 may output the image and/or video in the display disposed on the first surface so that the user 110 recognizes the ambient light through the display. The displaying area or displaying region (or active area or active region) of the display disposed on the first surface may be formed by one or more pixels included in the display. The electronic device 101 may synthesize the virtual object with the image and/or video outputted through the display so that the user 110 recognizes the virtual object together with the real object recognized by the ambient light.

Referring to FIG. 1, an example of the screen 130 displayed by the electronic device 101 is illustrated. The electronic device 101 may display an image and/or video of an external environment including the front direction of the user 110 wearing the electronic device 101 based on the VST (or pass-through). Using the screen 130 including the image and/or the video, the electronic device 101 may provide a user experience such as the user 110 wearing the electronic device 101 looking at the external environment (or such as not wearing the electronic device 101). Hereinafter, the VST and/or the pass-through are a function supported by the electronic device 101, and may refer to a function of displaying the screen 130 including the image and/or the video of the external environment to the user 110 wearing the electronic device 101.

Referring to FIG. 1, an environment including the user 110 wearing the electronic device 101 and another user 125 wearing an external electronic device 120 is illustrated. For convenience of explanation, the user 110 may be referred to as a first user 110, and the other user 125 may be referred to as a second user 125. Similarly, the electronic device 101 may be referred to as a first electronic device 101, and the external electronic device 120 may be referred to as a second electronic device 120. In the environment of FIG. 1, since the electronic device 101 covers two eyes of the first user 110 and the external electronic device 120 covers two eyes of the second user 125, the first user 110 may not see a portion of a face including the two eyes of the second user 125, and the second user 125 may not see a portion of a face including the two eyes of the first user 110. In case that the first user 110 and the second user 125 talk to each other, nonverbal expressions including a facial expression may be blocked by the electronic device 101 and/or the external electronic device 120.

According to an embodiment, the electronic device 101 may change at least a portion of the face of the second user 125 covered by the second electronic device 120 in the screen 130 displayed to the first user 110 in order to support exchanging of the nonverbal expressions between the first user 110 and the second user 125. Referring to FIG. 1, in the image and/or the video in the screen 130 displayed based on the pass-through, the electronic device 101 may display a visual object 140 corresponding to the second user 125.

In an embodiment, the electronic device 101 may couple a virtual object (e.g., a 3 dimensional graphical object), an image, and/or a video representing a body part of the second user 125 covered by the second electronic device 120 to a portion 142 covered (or hidden) by the second electronic device 120, in the visual object 140. The virtual object, image, and/or video coupled to the portion 142 may be determined based on information 150 received from the second electronic device 120. For example, the information 150 may be related to the two eyes of the second user 125, detected by the second electronic device 120. The information 150 may include an image and/or video of the two eyes of the second user 125. The information 150 may include parameters indicating directions of the two eyes of the second user 125.

Referring to FIG. 1, in the screen 130 displayed by the electronic device 101, since the portion 142 corresponding to the second electronic device 120 is replaced with the virtual object, image, and/or video representing the face of the second user 125, the first user 110 wearing the electronic device 101 may see the entire face of the second user 125. The first user 110 who sees the face of the second user 125 may recognize the nonverbal expression (e.g., the facial expression) of the second user 125. The electronic device 101 may support interaction between the first user 110 and the second user 125 by using the screen 130 including the entire face of the second user 125. Similarly, the electronic device 101 may transmit information related to the facial expression of the first user 110 wearing the electronic device 101 to the external electronic device 120. The information may include an image, a video, and/or parameters related to the two eyes of the first user 110 similar to the information 150 transmitted from the external electronic device 120 to the electronic device 101.

As described above, according to an embodiment, the electronic device 101 may provide the screen 130 related to the external environment to the first user 110 wearing the electronic device 101, based on the MR, the AR, and/or the XR. In order to support interaction between users (e.g., the first user 110 and/or the second user 125) wearing electronic devices (e.g., the electronic device 101 and/or the external electronic device 120), the electronic device 101 may display the screen 130 based on the pass-through. While displaying the visual object 140 for a counterpart (e.g., the second user 125) in the screen 130, the electronic device 101 may perform partial rendering on the portion 142 covered by the external electronic device 120 in the visual object 140. A hardware configuration of the electronic device 101 for the partial rendering will be described with reference to FIGS. 2A and/or 2B.

Based on the partial rendering, the electronic device 101 may at least partially display the counterpart's face covered (or hidden) by the external electronic device 120 instead of the visual object representing the external electronic device 120, in the portion 142. An operation for the electronic device 101 to display the counterpart's face covered by the external electronic device 120 will be described with reference to FIGS. 3 to 5, 6A, 6B, 7A, and/or 7B. An operation of the electronic device 101 receiving the information 150 from the external electronic device 120 and similarly transmitting other information to the external electronic device 120 will be described with reference to FIG. 8.

An operation of the electronic device 101 providing the pass-through and/or VST-based user experience is illustrated, but the embodiment is not limited thereto. For example, in an embodiment of the electronic device 101 having an AR-based form factor that transmits the ambient light, the electronic device 101 may project light representing the face of the second user 125 wearing the external electronic device 120 onto the portion 142 corresponding to the external electronic device 120, in the screen 130 based on the ambient light. The first user 110 viewing the projected light may see the face of the second user 125, such as not being covered by the external electronic device 120.

Hereinafter, a hardware configuration of the electronic device 101 of FIG. 1 will be described with reference to FIGS. 2A and/or 2B.

Figure 2A:
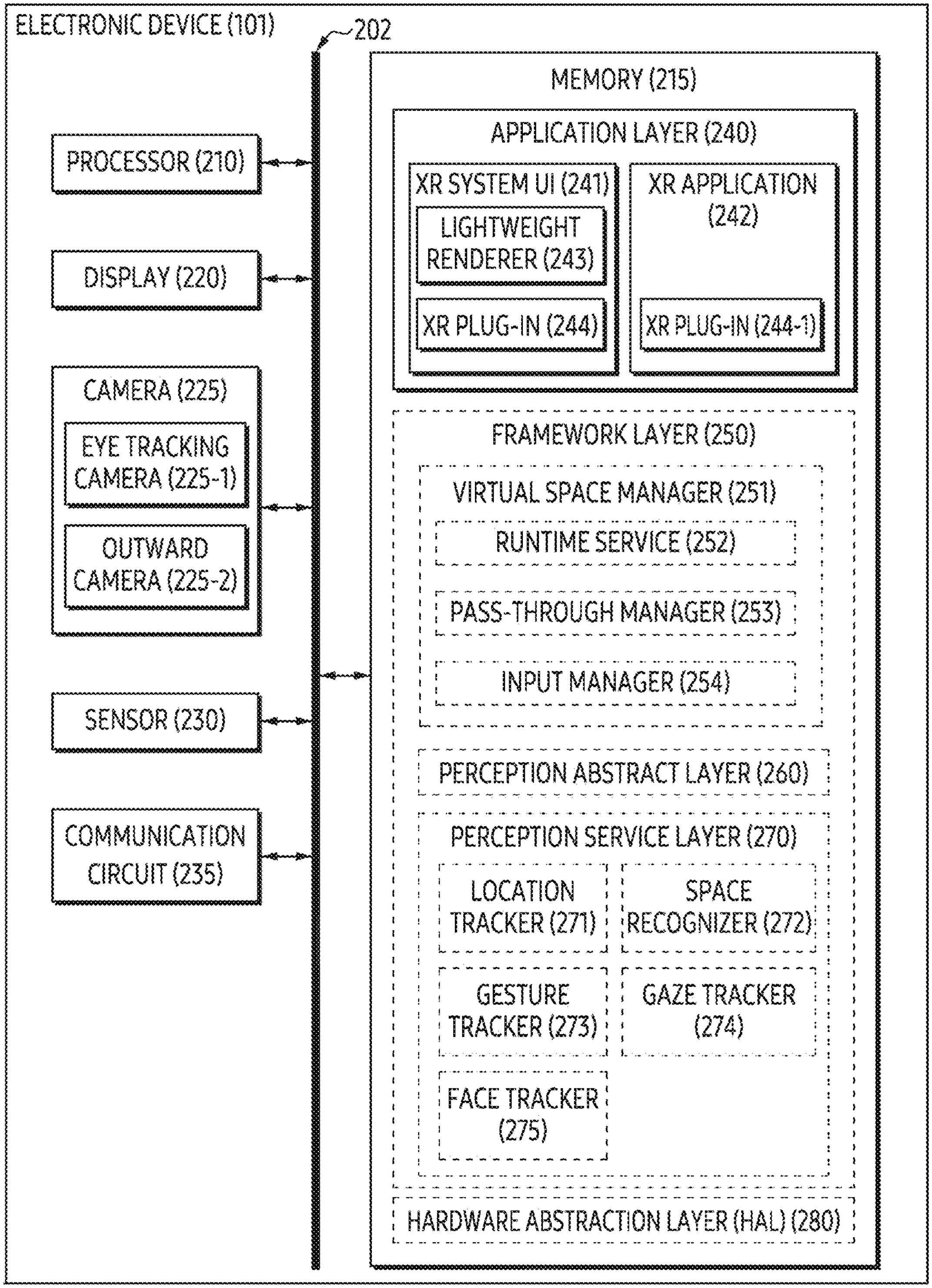
FIGS. 2A and 2B illustrate an example of a block diagram of an HMD device according to various embodiments of the disclosure.
Figure 2B:
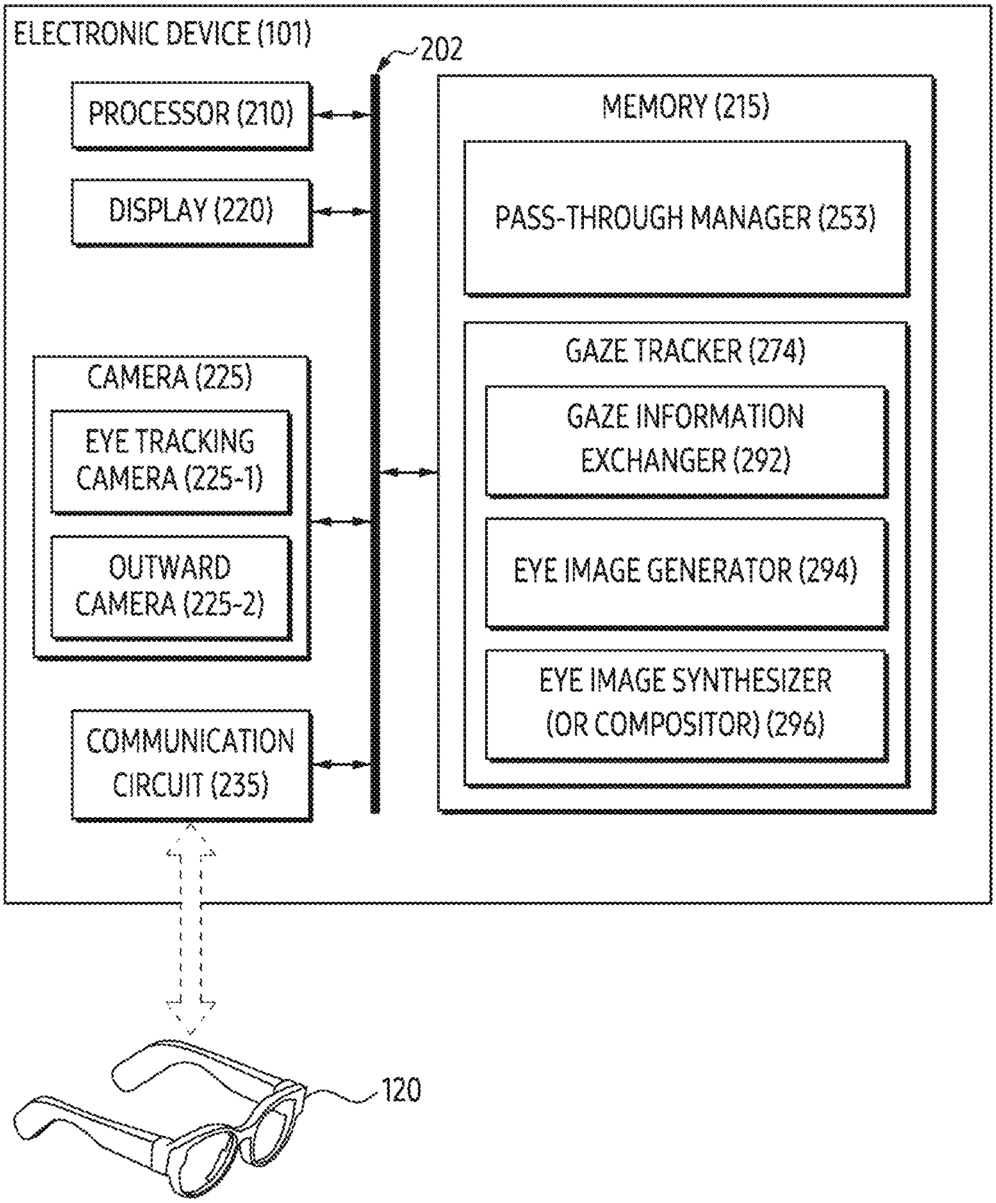

FIGS. 2A and 2B illustrate an example of a block diagram of an electronic device 101 according to various embodiments of the disclosure. The electronic device 101 of FIGS. 2A and/or 2B may include the electronic device 101 of FIG. 1.

Referring to FIG. 2A, the electronic device 101 according to an embodiment may include at least one of a processor 210, memory 215, a display 220, a camera 225, a sensor 230, and a communication circuit 235. The processor 210, the memory 215, the display 220, the camera 225, the sensor 230, and/or the communication circuit 235 may be electrically and/or operably coupled with each other by an electronical component such as a communication bus 202. The type and/or number of hardware components included in the electronic device 101 is not limited as illustrated in FIG. 2A. For example, the electronic device 101 may include only some of the hardware components illustrated in FIG. 2A.

The processor 210 of the electronic device 101 according to an embodiment may include a hardware component for processing data based on instructions. The hardware component for processing data may include, for example, an arithmetic and logic unit (ALU), a field programmable gate array (FPGA), a central processing unit (CPU), and/or an application processor (AP). In an embodiment, the electronic device 101 may include one or more processors. The processor 210 may have a structure of a multi-core processor such as a dual core, a quad core, a hexa core, and/or an octa core.

The memory 215 of the electronic device 101 according to an embodiment may include a hardware component for storing data and/or instructions inputted to the processor 210 or outputted from the processor 210. The memory 215 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multimedia card (eMMC). In an embodiment, the memory 215 may be referred to as storage.

In an embodiment, the display 220 of the electronic device 101 may output visualized information (e.g., a screen 130 of FIG. 1, a screen 540 of FIG. 5, a screen 630 of FIGS. 6A and/or 6B) to a user (e.g., a user 110 of FIG. 1) of the electronic device 101. For example, the display 220 may visualize information provided from the processor 210 including a circuit such as a graphic processing unit (GPU). The display 220 may include a flexible display, a flat panel display (FPD), and/or electronic paper. The display 220 may include a liquid crystal display (LCD), a plasma display panel (PDP), and/or one or more light emitting diodes (LEDs). The LED may include an organic LED (OLED). The embodiment is not limited thereto, and for example, in case that the electronic device 101 includes a lens for transmitting external light (or ambient light), the display 220 may include a projector (or projection assembly) for projecting light onto the lens. In an embodiment, the display 220 may be referred to as a display panel and/or display module.

In an embodiment, the camera 225 of the electronic device 101 may include optical sensors (e.g., a charged coupled device (CCD) sensor, a complementary metal oxide semiconductor (CMOS) sensor) that generate an electrical signal indicating a color and/or brightness of the light. The camera 225 may be referred to as an image sensor, and may be included in the sensor 230 of FIGS. 2A and 2B. A plurality of optical sensors included in the camera 225 may be disposed in the form of a 2 dimensional array. The camera 225 may generate 2 dimensional frame data corresponding to light reaching the optical sensors of the 2 dimensional array, by obtaining electrical signals of each of the plurality of optical sensors substantially simultaneously. For example, photo data captured using the camera 225 may mean a 2 dimensional frame data obtained from the camera 225. For example, video data captured using the camera 225 may mean a sequence of 2 dimensional frame data obtained from the camera 225 according to a frame rate. The camera 225 may be disposed toward a direction in which the camera 225 receives the light and may further include a flash light for outputting the light toward the direction.

According to an embodiment, the electronic device 101 is an example of the camera 225 and may include a plurality of cameras disposed toward different directions. Referring to FIGS. 2A and 2B, the camera 225 included in the electronic device 101 may include an eye tracking camera 225-1 and/or an outward camera 225-2. The eye tracking camera 225-1 may be disposed toward at least one of the two eyes of the user wearing the electronic device 101. In order to be disposed toward each of the user's two eyes, the electronic device 101 may include two eye tracking cameras 225-1. The processor 210 may identify a direction of the user's gaze by using the image and/or video obtained from the eye tracking camera 225-1. The eye tracking camera 225-1 may include an infrared (IR) sensor. The eye tracking camera 225-1 may be referred to as an eye sensor, a gaze tracker, and/or an eye tracker.

Referring to FIGS. 2A and 2B, the outward camera 225-2 may be disposed toward a front direction (e.g., a direction in which the two eyes may be directed) of the user wearing the electronic device 101. The embodiment is not limited thereto, and the outward camera 225-2 may be disposed toward the external space. Using the image and/or video obtained from the outward camera 225-2, the processor 210 may identify an external object (e.g., e.g., a second electronic device 120 and/or a second user 125 of FIG. 1). The processor 210 may provide a user experience based on VST and/or pass-through, by displaying the image and/or video obtained from the outward camera 225-2 on the display 220.

According to an embodiment, the sensor 230 of the electronic device 101 may generate electrical information that may be processed and/or stored by the processor 210 and/or the memory 215 of the electronic device 101 from non-electronic information related to the electronic device 101. The information may be referred to as sensor data. The sensor 230 may include a global positioning system (GPS) sensor, an image sensor, an audio sensor (e.g., a microphone array including a microphone and/or a plurality of microphones), a grip sensor, a touch sensor (or a touch sensor panel (TSP), a proximity sensor, an illumination sensor, and/or a time-of-flight (ToF) sensor (or a ToF camera) for detecting a geographic location of the electronic device 101.

In an embodiment, the sensor 230 may include an inertial measurement unit (IMU) for detecting a physical motion of the electronic device 101. An acceleration sensor, a geomagnetic sensor, a gravity sensor, or any combination thereof may be referred to as an IMU. The acceleration sensor may output an electrical signal indicating gravitational acceleration and/or acceleration of each of a plurality of axes (e.g., x-axis, y-axis, and z-axis), which are perpendicular to each other and based on the designated origin of the electronic device 101. The gyro sensor may output an electrical signal indicating angular velocities (e.g., roll, pitch, and/or yaw) of the plurality of axes. The gyro sensor may be referred to as an angular velocity sensor. The geomagnetic sensor may output an electrical signal indicating a size of a magnetic field formed in the electronic device 101 along each of the plurality of axes (e.g., x-axis, y-axis, and/or z-axis). For example, the acceleration sensor, the gyro sensor, and/or the geomagnetic sensor may repeatedly output sensor data including accelerations, angular velocities, and/or sizes of the magnetic field of the number of the plurality of axes based on a designated period (e.g., 1 millisecond).

In an embodiment, the communication circuit 235 of the electronic device 101 may include a circuit for supporting transmission and/or reception of a signal between the electronic device 101 and an external electronic device (e.g., an external electronic device 120 of FIG. 1). The communication circuit 235 may include at least one of, for example, a modem (MODEM), an antenna, and an optic/electronic (O/E) converter. The communication circuit 235 may support the transmission and/or reception of the electrical signal based on various types of protocols such as ethernet and local area network (LAN), wide area network (WAN), wireless fidelity (WiFi), Bluetooth, bluetooth low energy (BLE), ZigBee, long term evolution (LTE), 5G new radio (NR), 6G, and/or above-6G. In an embodiment, the communication circuit 235 may be referred to as a communication processor and/or a communication module.

According to an embodiment, in the memory 215 of the electronic device 101, data to be processed by the processor 210 of the electronic device 101 and one or more instructions (or commands) indicating a calculation and/or an operation to be performed may be stored. The set of the one or more instructions may be referred to as a program, firmware, operating system, process, routine, sub-routine and/or software application (hereinafter referred to as an application). For example, the electronic device 101 and/or the processor 210 may perform at least one of the operations of FIG. 3 when a set of a plurality of instructions distributed in the form of an operating system, firmware, driver, program, and/or application are executed. Hereinafter, the fact that the application is installed in the electronic device 101 may mean that one or more instructions provided in the form of an application are stored in the memory 215, and the one or more applications are stored in an executable format (e.g., a file having an extension designated by the operating system of the electronic device 101) by the processor 210. For example, the application may include a program and/or a library related to a service provided to the user.

Referring to FIGS. 2A and 2B, programs installed in the electronic device 101 may be included in any one layer among different layers including an application layer 240, a framework layer 250, and/or a hardware abstraction layer (HAL) 280, based on a target. For example, programs (e.g., a module, or a driver) designed to target the hardware (e.g., the display 220, the camera 225, the sensor 230, and/or the communication circuit 235) of the electronic device 101 may be included in the hardware abstraction layer (HAL) 280. The framework layer 250 may be referred to as an XR framework layer, in terms of including one or more programs for providing an extended reality (XR) service. For example, the layers illustrated in FIGS. 2A and 2B are logically (or for convenience of explanation) divided and may not mean that an address space of the memory 215 is divided by the layers.

For example, programs (e.g., a location tracker 271, a space recognizer 272, a gesture tracker 273, a gaze tracker 274, and/or a face tracker 275) designed to target at least one of the hardware abstraction layer (HAL) 280 and/or the application layer 240 may be included in the framework layer 250. The programs included in the framework layer 250 may provide an application programming interface (API) that may be executed (or invoked or called) based on another program.

For example, in the application layer 240, a program designed to target the user of the electronic device 101 may be included. As an example of programs included in the application layer 240, an extended reality (XR) system user interface (UI) 241 and/or an XR application 242 are exemplified, but the embodiment is not limited thereto. For example, the programs (e.g., a software application) included in the application layer 240 may cause execution of functions supported by the programs included in the framework layer 250, by calling the application programming interface (API).

For example, the electronic device 101 may display one or more visual objects for performing interaction with the user on the display 220 based on execution of the XR system UI 241. The visual object may mean an object that is deployable in the screen for transmission and/or interaction of information, such as text, an image, an icon, a video, a button, a check box, a radio button, a text box, a slider and/or a table. The visual object may be referred to as a visual guide, a virtual object, a visual element, a UI element, a view object, and/or a view element. The electronic device 101 may provide the user with functions available in the virtual space based on execution of the XR system UI 241.

Referring to FIGS. 2A and 2B, a lightweight renderer 243 and/or an XR plug-in 244 are illustrated to be included in the XR system UI 241, but are not limited thereto. For example, based on the XR system UI 241, the processor 210 may execute the lightweight renderer 243 and/or the XR plug-in 244 in the framework layer 250.

For example, based on the execution of the lightweight renderer 243, the electronic device 101 may obtain a resource (e.g., API, system process, and/or library) used to define, create, and/or execute a rendering pipeline that is allowed partial change. The lightweight renderer 243 may be referred to as a lightweight render pipeline in terms of defining the rendering pipeline that is allowed partial change. The lightweight renderer 243 may include a renderer (e.g., a prebuilt renderer) built before execution of the software application. For example, the electronic device 101 may obtain the resource (e.g., API, system process, and/or library) used to define, create, and/or execute the entire rendering pipeline based on execution of the XR plug-in 244. The XR plug-in 244 may be referred to as an open XR native client in terms of defining (or setting) the entire rendering pipeline.

For example, the electronic device 101 may display a screen indicating at least a portion of the virtual space on the display 220 based on execution of the XR application 242. A XR plug-in 244-1 included in the XR application 242 may include instructions that support a function similar to that of the XR plug-in 244 of the XR system UI 241. Among a description of the XR plug-in 244-1, a description that overlap with a description of the XR plug-in 244 may be omitted. The electronic device 101 may cause execution of a virtual space manager 251 based on the execution of the XR application 242.

According to an embodiment, the electronic device 101 may provide a virtual space service based on the execution of the virtual space manager 251. For example, the virtual space manager 251 may include a platform for supporting the virtual space service. Based on the execution of the virtual space manager 251, the electronic device 101 may identify a virtual space formed based on the user's location indicated by the data obtained through the sensor 230, and may display at least a portion of the virtual space on the display 220. The virtual space manager 251 may be referred to as a composition presentation manager (CPM).

For example, the virtual space manager 251 may include a runtime service 252. For example, the runtime service 252 may be referred to as an OpenXR runtime module (or OpenXR runtime program). The electronic device 101 may execute at least one of a user's pose prediction function, a frame timing function, and/or a space input function based on the execution of the runtime service 252. For example, the electronic device 101 may perform rendering for the virtual space service to the user based on the execution of the runtime service 252. For example, based on the execution of the runtime service 252, a function related to the virtual space that may be executed by the application layer 240 may be supported.

For example, the virtual space manager 251 may include a pass-through manager 253. Based on execution of the pass-through manager 253, the electronic device 101 may display an image and/or video indicating an actual space obtained through the outward camera 225-2 by overlapping on at least a portion of the screen, while displaying a screen (e.g., the screen 130 of FIG. 1) indicating the virtual space on the display 220.

For example, the virtual space manager 251 may include an input manager 254. The electronic device 101 may identify data (e.g., sensor data) obtained by executing one or more programs included in a perception service layer 270 based on execution of the input manager 254. The electronic device 101 may identify a user input related to the electronic device 101 by using the obtained data. The user input may be related to the user's motion (e.g., hand gesture), gaze, and/or utterance identified by the sensor 230 and/or the camera 225 (e.g., the outward camera 225-2). The user input may be identified based on an external electronic device (e.g., a remote controller provided to control the electronic device 101) connected (or paired) through the communication circuit 235.

For example, a perception abstract layer 260 may be used for data exchange between the virtual space manager 251 and the perception service layer 270. In terms of being used for the data exchange between the virtual space manager 251 and the perception service layer 270, the perception abstract layer 260 may be referred to as an interface. For example, the perception abstract layer 260 may be referred to as OpenPX. The perception abstract layer 260 may be used for a perception client and a perception service.

According to an embodiment, the perception service layer 270 may include one or more programs for processing data obtained from the sensor 230 and/or the camera 225. The one or more programs may include at least one of the location tracker 271, the space recognizer 272, the gesture tracker 273, the gaze tracker 274, and/or the face tracker 275. The type and/or number of one or more programs included in the perception service layer 270 is not limited as illustrated in FIGS. 2A and 2B.

For example, the electronic device 101 may identify a posture of the electronic device 101 by using the sensor 230 based on execution of the location tracker 271. Based on the execution of the location tracker 271, the electronic device 101 may identify the 6 degrees of freedom pose (6 dof pose) of the electronic device 101 by using data obtained using the outward camera 225-2 and/or the IMU (e.g., the gyro sensor, the acceleration sensor, and/or the geomagnetic sensor). The location tracker 271 may be referred to as a head tracking (HeT) module (or a head tracker, a head tracking program).

For example, the electronic device 101 may obtain information for providing a 3 dimensional virtual space corresponding to a surrounding environment (e.g., the external space) of the electronic device 101 (or the user of the electronic device 101) based on execution of the space recognizer 272. The electronic device 101 may reconstruct the surrounding environment of the electronic device 101 in 3 dimensions by using the data obtained using the outward camera 225-2 based on the execution of the space recognizer 272. The electronic device 101 may identify at least one of a plane, an inclination, and a staircase based on the surrounding environment of the electronic device 101 reconstructed in 3 dimensions based on the execution of the space recognizer 272. The space recognizer 272 may be referred to as a scene understanding (SU) module (or scene understanding (SU) program).

For example, the electronic device 101 may identify (or recognize) a pose and/or gesture of the user's hand of the electronic device 101 based on execution of the gesture tracker 273. For example, the electronic device 101 may identify the pose and/or gesture of the user's hand by using data obtained from the outward camera 225-2 based on the execution of the gesture tracker 273. For example, the electronic device 101 may identify the pose and/or gesture of the user's hand based on the data (or an image) obtained using the outward camera 225-2 based on the execution of the gesture tracker 273. The gesture tracker 273 may be referred to as a hand tracking (HaT) module (or hand tracking program), and/or a gesture tracking module.

For example, the electronic device 101 may identify (or track) movement of the user's eyes of the electronic device 101 based on execution of the gaze tracker 274. For example, the electronic device 101 may identify the movement of the user's eyes by using data obtained from the eye tracking camera 225-1 based on the execution of the gaze tracker 274. The gaze tracker 274 may be referred to as an eye tracking (ET) module (or an eye tracking program), and/or a gaze tracking module.

For example, the perception service layer 270 of the electronic device 101 may further include the face tracker 275 for tracking the user's face. For example, the electronic device 101 may identify (or track) the movement of the user's face and/or the user's facial expression based on execution of the face tracker 275. The electronic device 101 may estimate the user's facial expression based on the movement of the user's face based on the execution of the face tracker 275. For example, the electronic device 101 may identify the movement of the user's face and/or the user's facial expression based on data (e.g., an image) obtained using the sensor 230 (e.g., an image sensor facing at least a portion of the user's face) based on the execution of the face tracker 275.

According to an embodiment, the processor 210 of the electronic device 101 may remove appearance in the screen of the external electronic device (e.g., the external electronic device 120 of FIG. 1) connected to the electronic device 101 through the communication circuit 235, while displaying a screen based on the pass-through. Removing the appearance of the external electronic device may include an operation of synthesizing a virtual object, image, and/or video representing a body part covered by the external electronic device. The body part may include two eyes of a user wearing the external electronic device.

Referring to FIG. 2B, among the programs of FIG. 2A, one or more programs executed to remove the appearance of the external electronic device 120 are exemplarily illustrated. The embodiment is not limited thereto.

According to an embodiment, the processor 210 of the electronic device 101 may conditionally perform an operation of removing the appearance of the external electronic device 120 based on interaction between the electronic device 101 and the external electronic device 120. The interaction may include a positional relationship between the electronic device 101 and the external electronic device 120 and/or an interaction (e.g., conversation) between the electronic device 101 and users wearing the external electronic device 120. The interaction may be detected based on information included in the electronic device 101, such as an address book. The interaction may be detected based on usage history of the electronic device 101. The interaction may be detected based on whether the external electronic device 120 is an electronic device related to a user registered in the address book and/or a list previously designated by the user. An operation in which the processor 210 of the electronic device 101 identifies the interaction will be described with reference to FIG. 4.

The processor 210 that detected the interaction between the electronic device 101 and the external electronic device 120 (e.g., the external electronic device 120 of FIG. 1) may detect a portion corresponding to the external electronic device 120 in an image and/or video of the external environment displayed through the display 220. Hereinafter, an embodiment based on the external electronic device 120, such as an HMD device, is described, but the embodiment is not limited thereto, and the external electronic device 120 may include a portable electronic device such as a smartphone and/or another real object. The processor 210 may control the outward camera 225-2 to obtain the image and/or the video. In the image and/or video, the processor 210 that detected a portion corresponding to the external electronic device 120 may execute a function for inferring appearance of the body part covered by the external electronic device 120 in the portion.

The processor 210 may receive information (e.g., information 150 of FIG. 1) on the body part covered by the external electronic device 120, from the external electronic device 120 connected through the communication circuit 235. The information may be received through the communication link after a communication link between the electronic device 101 and the external electronic device 120 is established. For example, the information may be received before detecting the interaction between the electronic device 101 and the external electronic device 120, substantially coincides with the timing of detecting the interaction, or after detecting the interaction.

Referring to FIG. 2B, one or more programs (e.g., a gaze information exchanger 292, an eye image generator 294, and/or an eye image synthesizer (or compositor) 296) included in the gaze tracker 274 are illustrated. The processor 210 may receive information from the external electronic device 120 based on execution of the gaze information exchanger 292. Based on the execution of the gaze information exchanger 292, the processor 210 may control the communication circuit 235 to transmit information related to the eye tracking camera 225-1 to the external electronic device 120. The information related to the eye tracking camera 225-1 may include information related to the gaze of the user (e.g., a first user 110 of FIG. 1) wearing the electronic device 101. The information related to the gaze of the user wearing the electronic device 101 may include an image and/or video related to at least one of the user's two eyes. The embodiment is not limited thereto, and the information transmitted to the external electronic device 120 may include parameters (e.g., a direction and/or angle in which two eyes face) calculated by the processor 210 based on the image and/or video. For example, the processor 210 may transmit the information indicating the direction of the user's gaze to the external electronic device 120 through the communication circuit 235.

According to an embodiment, the processor 210 of the electronic device 101 may perform rendering with respect to a body part of the user wearing the external electronic device 120 based on execution of the eye image generator 294. For example, the processor 210 may perform the rendering based on information received from the external electronic device 120. The processor 210 that executed the eye image generator 294 may perform the rendering by using information obtained from the external electronic device 120 based on the gaze information exchanger 292. Based on the rendering with respect to the body part, the processor 210 may obtain a virtual object (e.g., a 3 dimensional graphical object including a mesh representing the head and/or eyes) representing the body part, an image, and/or a video. An operation of the processor 210 that executed the eye image generator 294 will be described with reference to FIGS. 5 and/or 6A and/or 6B.

According to an embodiment, the processor 210 of the electronic device 101 may display a composite image on the display 220, based on execution of the eye image synthesizer (or compositor) 296. For example, the processor 210 may display, on the display 220, a composite image generated based on a first image obtained from the outward camera 225-2 and a second image obtained from the eye image generator 294. The composite image may be an image in which at least a portion of the first image is replaced with the second image. The composite image may include the first image and the second image overlapped (or positioned) on at least a portion of the first image. A graphical object (e.g., the virtual object, the image and/or the video) generated by the eye image generator 294 may be displayed. While displaying the first image obtained from the outward camera 225-2, the processor 210 may display the first image including a replaced portion (e.g., a portion corresponding to the external electronic device 120) based on the second image obtained from the eye image generator 294. The embodiment is not limited thereto, and the processor 210 may display by overlapping and/or updating the second image on the first image displayed on the display 220. The embodiment is not limited thereto, and the processor 210 may synthesize a new image in which the portion of the first image in which the external electronic device 120 is captured is changed to the second image, by synthesizing the first image and the second image. A portion of the first image overlapping the second image may be a portion in which the external electronic device 120 is captured. The second image may be obtained by performing rendering based on a direction of gaze indicated by the information received from the external electronic device 120. The second image may include at least a portion representing eyes of the user wearing the external electronic device. The second image may be generated based on the execution of the eye image generator 294.

According to an embodiment, the processor 210 of the electronic device 101 may display the first image in which the second image is overlapped on the display 220, based on execution of the eye image synthesizer (or compositor) 296 and/or the pass-through manager 253. Based on the second image, the electronic device 101 may provide a user experience, such as viewing another user's body part covered by the external electronic device 120, to the user wearing the electronic device 101. For example, based on the execution of the eye image synthesizer (or compositor) 296, the processor 210 may determine a point on the first image to be overlapped with the second image generated by the eye image generator 294. Based on the execution of the pass-through manager 253, the processor 210 may display the first image that is overlapped with the second image, on the display 220.

As described above, according to an embodiment, the electronic device 101 may perform an operation for removing the appearance of the external electronic device 120 on the display 220, by using the gaze of the user wearing the external electronic device 120 tracked by the external electronic device 120, and the user's face tracked based on the external camera 225-2. For example, the electronic device 101 may display a virtual object (e.g., an avatar) representing the gaze by overlapping it on a portion corresponding to the external electronic device 120 in the image and/or video displayed on the display 220. In order to assist the external electronic device 120 removing the appearance of the electronic device 101 from the display of the external electronic device 120, the electronic device 101 may transmit information related to the user's gaze tracked based on the eye tracking camera 225-1 to the external electronic device 120.

Hereinafter, an operation of the electronic device 101 and/or the processor 210 described with reference to FIGS. 1, 2A, and/or 2B will be described with reference to FIG. 3.

Figure 3:
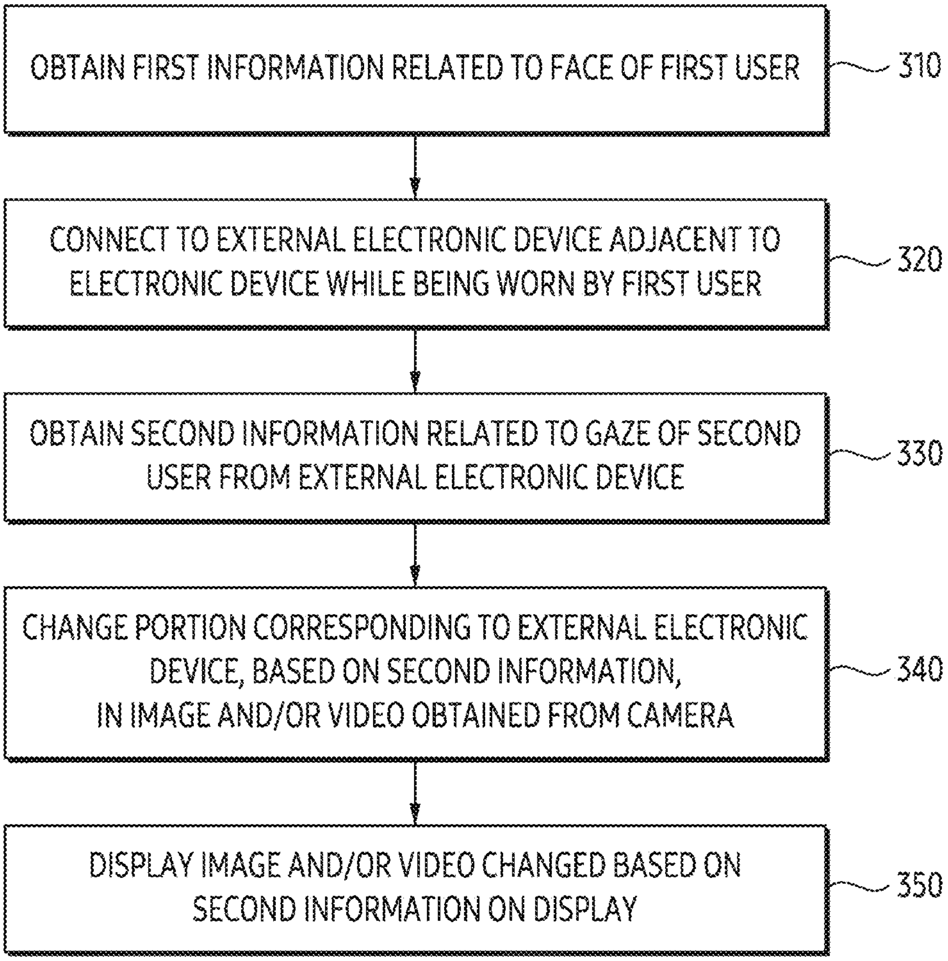
FIG. 3 illustrates an example of a flowchart of an HMD device according to an embodiment of the disclosure.

FIG. 3 illustrates an example of a flowchart of an electronic device according to an embodiment of the disclosure. An electronic device 101 and/or a processor 210 of FIGS. 1, 2A, and/or 2B may perform at least one of operations described with reference to FIG. 3.

Referring to FIG. 3, in operation 310, according to an embodiment, a processor of the electronic device may obtain first information related to a face of a first user. The first user of the operation 310 may include a person identified as a user wearing the electronic device, such as a first user 110 of FIG. 1. The first information of the operation 310 may include a photo (e.g., selfie) related to the face of the first user.

In an embodiment, the first information of the operation 310 may include time-of-flight (ToF) and/or data (e.g., a mesh, vertices, voxels, fragments, and/or textures related to at least a portion of the face) used to 3 dimensionally render the face of the first user obtained by a time-of-flight (ToF) and/or a stereo camera. The first information may be obtained at a timing at which the first user wears the electronic device. The embodiment is not limited thereto, and the processor of the electronic device may obtain the first information of the operation 310 from an image and/or video stored in memory (e.g., memory 215 of FIGS. 2A and/or 2B).

Referring to FIG. 3, in operation 320, according to an embodiment, the processor of the electronic device may be connected to an external electronic device adjacent to the electronic device while being worn by the first user. The electronic device may determine whether to be worn by the first user based on sensor data of a sensor (e.g., a sensor 230 of FIGS. 2A and 2B). While worn by the first user, the electronic device may search for or identify the external electronic device (e.g., an external electronic device 120 of FIG. 1) adjacent to the electronic device, by using a communication circuit (e.g., a communication circuit 235 of FIGS. 2A and 2B). The search of the external electronic device may be performed based on a wireless communication protocol such as bluetooth low energy (BLE) and/or ultra-wideband (UWB). Based on the search of the external electronic device, the processor may establish a communication link between the electronic device and the external electronic device, by controlling the communication circuit. The communication link may be established based on a wireless communication protocol such as Wi-Fi direct and/or Bluetooth. For example, a discovery procedure of the Wi-Fi direct may be performed to connect to the external electronic device of the operation 320. Based on the discovery procedure, the communication link between the electronic device and the external electronic device may be established. For example, a wireless signal for detecting an external electronic device, such as an advertising signal, may be transmitted by the electronic device performing the operation 320. Based on a response to the advertising signal, the electronic device may be connected to the external electronic device.

In an embodiment, the processor of the electronic device may perform the operation 320 based on whether an interaction between the electronic device and the external electronic device is detected. The interaction may be detected based on a distance between the electronic device and the external electronic device, whether the external electronic device is facing the electronic device, and/or utterance of at least one of the user wearing the electronic device and the user wearing the external electronic device. In an embodiment, the processor that detected the interaction may display a screen and/or a visual object confirming a connection with the external electronic device. In response to a user input confirming connection with the external electronic device, the processor may perform the operation 320.

While connected to the external electronic device based on the operation 320, the processor of the electronic device may enter a reverse pass-through mode. In the reverse pass-through mode, the electronic device may execute a function for removing appearance of the external electronic device in the screen displayed to the first user, and may provide information used to remove the appearance of the electronic device in a screen displayed to a second user of the external electronic device to the external electronic device, by communicating with the external electronic device. For example, in the reverse pass-through mode, the processor may repeatedly perform operations 330, 340, and 350 of FIG. 3 by using the communication link established based on the operation 320.

Referring to FIG. 3, in the operation 330, according to an embodiment, the processor of the electronic device may obtain second information related to gaze of the second user (e.g., a second user 125 of FIG. 1) from the external electronic device (e.g., the external electronic device 120 of FIGS. 1 and/or 2B). The second information of the operation 330 may include information 150 of FIG. 1. Through the communication link established based on the operation 320, the processor may receive the second information repeatedly (or continuously or periodically). The second information may include an image and/or video of two eyes of the second user, captured by the external electronic device. The second information may include a numeric value calculated by the external electronic device, indicating a direction of the second user's gaze. The second information of the operation 330 may be referred to as eye tracking information identified by the external electronic device. The embodiment is not limited thereto, and the second information may include an image, which is an image synthesized by the external electronic device, representing a user's body part (e.g., a portion of the user's face including the two eyes) covered by the external electronic device. For example, the external electronic device may generate an image to be transmitted to the electronic device, by using the image and/or video of the user's two eyes captured by the external electronic device. As another example, the second information is the image synthesized by the external electronic device, and may include an image representing the entire face of the user wearing the external electronic device. For example, the external electronic device may generate the image to be transmitted to the electronic device, by combining or synthesizing another image generated by the eye tracking information identified by the external electronic device on the image of the face of the user wearing the external electronic device.

In an embodiment, a period at which the processor receives the second information of the operation 330 may be adaptively adjusted according to a state of the electronic device and/or the external electronic device. For example, the processor may change a period of receiving the second information according to a direction of the user's gaze of the electronic device. For example, in case that the user's gaze of the electronic device is directed to the external electronic device, the electronic device may transmit a signal for reducing a period in which the external electronic device transmits the second information, to the external electronic device. For example, in case that the user's gaze of the electronic device is directed in a direction different from that of the external electronic device, the electronic device may transmit a signal for increasing the period of receiving the second information to the external electronic device.

In an embodiment, an embodiment in which the electronic device receives the second information based on data communication is described, but the embodiment is not limited thereto. For example, the processor may transmit the second information by using another medium such as infrared communication and/or acoustic waves.

A size of the second information obtained from the external electronic device based on the operation 330 may be related (e.g., inversely proportional) to a distance between the electronic device 101 and the external electronic device. For example, as the external electronic device moves away from the user, a size of the portion covered by the external electronic device may decrease in the screen displayed by the electronic device 101. In the above example, the electronic device may request the external electronic device to transmit the second information, with a size based on the distance between the external electronic device and the electronic device.

In a state of obtaining the second information based on the operation 330, the processor of the electronic device may transmit information related to the gaze of the first user to the external electronic device. For example, based at least on the operation 330, an exchange of the eye tracking information of the first user and the second user may be performed between the electronic device and the external electronic device. The exchange of the eye tracking information may be performed through the communication link established based on the operation 320.

Information exchanged through the communication link of the operation 320 is not limited to the eye tracking information. For example, in a state in which the communication link is established, the electronic device may transmit the first information of the operation 310 to the external electronic device. The first information transmitted to the external electronic device may be used for rendering with respect to at least a portion of the face of the first user covered by the electronic device. For example, in the state in which the communication link is established, the electronic device may obtain third information related to the face of the second user from the external electronic device. The third information may be obtained by the external electronic device that has performed an operation similar to the operation 310. The third information may include a photo related to the face of the second user.

Referring to FIG. 3, in operation 340, according to an embodiment, the processor of the electronic device may change a portion corresponding to the external electronic device, based on the second information, in an image and/or video obtained from the camera. The camera of the operation 340 may include a camera 225 of FIGS. 2A and 2B and/or an outward camera 225-2. The processor may determine or identify the portion corresponding to the external electronic device in the image and/or video, based on object recognition. The object recognition may be performed based on one or more feature points (or key points) extracted from the image and/or video. The object recognition may be performed based on a model (e.g., a neural network such as a convolutional neural network (CNN) in which the image and/or the video is inputted.

For example, the processor may obtain coordinates of vertices of a polygon (e.g., a quadrangle such as a bounding box) representing the portion. For example, the processor may obtain pixel-wise probabilities that each of pixels of the image and/or the video corresponds to the external electronic device. At least one pixel corresponding to at least one probability exceeding a threshold among the probabilities may be included in the portion of the image and/or the video from which the external electronic device is captured.

In the operation 340, the processor of the electronic device may obtain a virtual object representing the body part covered by the external electronic device, based on the second information received from the external electronic device through the communication circuit. The virtual object may be obtained based on at least one of the third information and/or the second information related to the face of the second user, received from the external electronic device through the communication link. An operation of a processor changing at least a portion of the image and/or video of the operation 340 based on a 3 dimensional virtual object will be described with reference to FIG. 5.

In the operation 340, the processor of the electronic device may infer appearance of the body part covered by the external electronic device based on the second information received from the external electronic device through the communication circuit. Inferring the appearance of the body part may be performed by a model driven by the processor. The model may include hardware for performing a computation based on a mathematical model (e.g., a neural network) that mathematically models neural activity of a human and/or animal. An operation of the processor changing at least a portion of the image and/or video of the operation 340 based on a result of inferring the appearance of the body part will be described with reference to FIGS. 6A and/or 6B.

Referring to FIG. 3, in the operation 350, according to an embodiment, the processor of the electronic device may display the image and/or video changed based on the second information on the display. For example, while displaying the image and/or video on the display (e.g., a display 220 of FIG. 2A), the processor may display at least a portion of the virtual object obtained based on the operation 340, on at least a portion of the display on which the portion of the operation 340 is displayed. For example, the processor may display the appearance of the body part inferred by the model by overlapping on the at least portion of the display. Based on the operation 350, the processor may align or synthesize the image and/or video obtained from the camera with the image and/or video obtained based on the second information.

In an embodiment, obtaining the second information based on the operation 330 may be delayed or stopped according to a communication state between the electronic device and the external electronic device. According to an embodiment, in case of receiving the second information is stopped or delayed, the processor of the electronic device may play a designated animation related to the appearance of the body part covered by the external electronic device. The designated animation may include an image and/or video that was displayed before receiving the second information stopped. The embodiment is not limited thereto, and in case that the state of charge (SOC) of the battery is reduced to a designated SOC or less, the processor of the electronic device may stop receiving the second information by using the communication link and may display the image and/or video displayed before the SOC is reduced to the designated SOC or less.

According to an embodiment, the processor of the electronic device may repeatedly perform the operations 330, 340, and 350. While the operations 330, 340, and 350 are repeatedly performed based on the reverse pass-through mode, the processor may determine whether interaction between the electronic device and the external electronic device is interrupted. In case that the interaction between the electronic device and the external electronic device is stopped, the processor may stop repeatedly performing the operations 330, 340, and 350. In case that the interaction between the electronic device and the external electronic device is stopped, the processor may display, based on the display, a screen and/or a virtual object confirming whether to stop the operations 330, 340, and 350 performed to display the body part covered by the external electronic device. In response to an input to the screen and/or the virtual object, the processor of the electronic device may stop repeatedly performing the operations 330, 340, and 350. Since performing the operations 330, 340, and 350 is stopped, the user wearing the electronic device may view the external electronic device through the image and/or video of the external environment displayed on the display.

According to an embodiment, the processor of the electronic device may reduce or optimize a computational amount for changing the image and/or video based on the operation 340 while repeatedly performing the operations 330, 340, and 350. For example, the processor may adjust a frequency of inferring appearance of the second user's body part covered by the external electronic device based on a size of a portion of the display corresponding to the external electronic device. An operation performed by the processor of the electronic device to optimize the computational amount will be described with reference to FIGS. 7A and 7B.

Hereinafter, an operation of an electronic device detecting the interaction between the electronic device and the external electronic device will be described with reference to FIG. 4.

Figure 4:
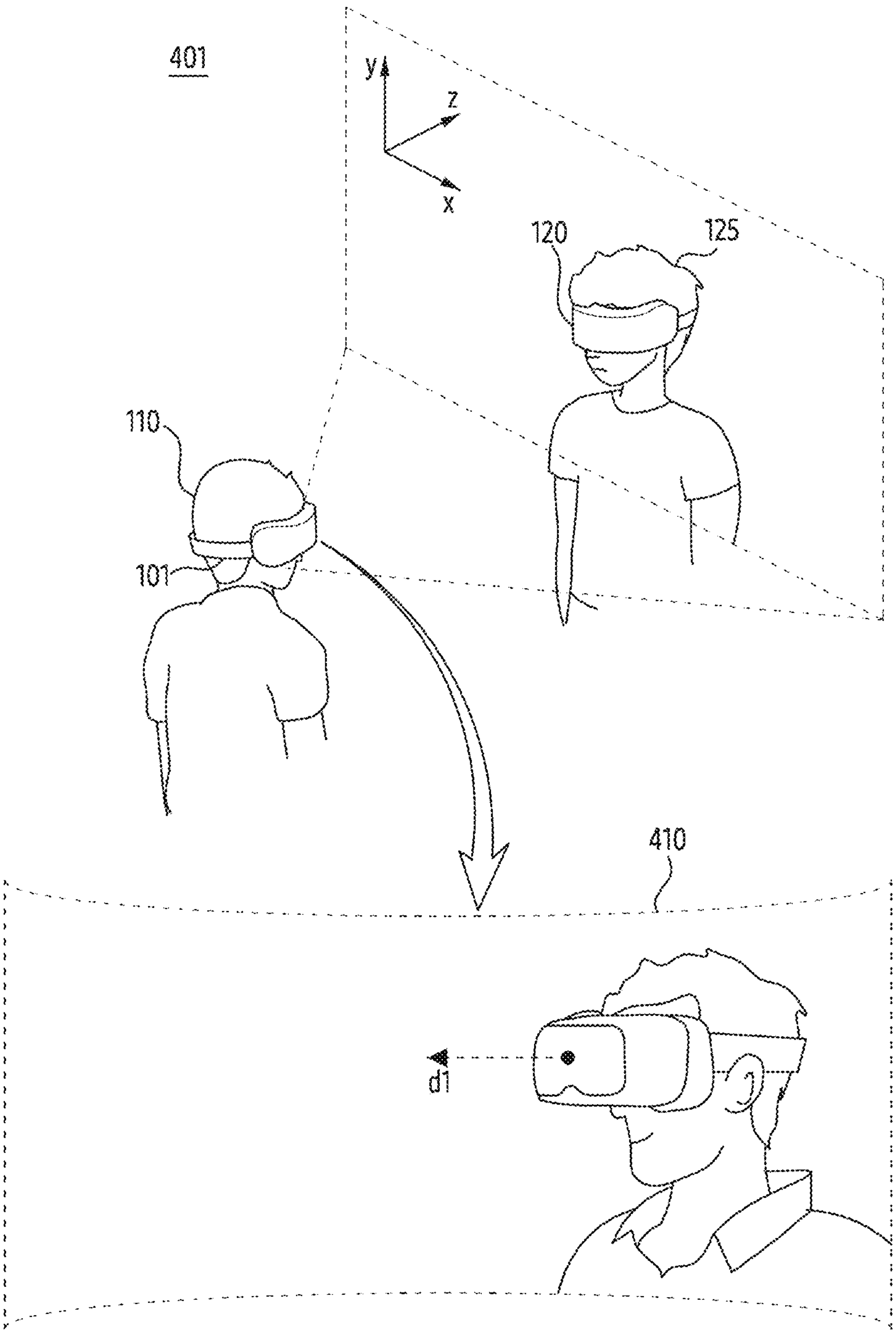
FIG. 4 illustrates an example of an operation of an HMD device based on an image and/or video obtained from a camera according to an embodiment of the disclosure.

FIG. 4 illustrates an example of an operation of an electronic device 101 based on an image 410 and/or video obtained from a camera according to an embodiment of the disclosure. The electronic device 101 of FIGS. 1, 2A, and 2B and/or a processor 210 of FIGS. 2A and 2B may perform the operation of the electronic device 101 described with reference to FIG. 4. The operation of the electronic device 101 described with reference to FIG. 4 may be related to at least one of operations of FIG. 3.

Referring to FIG. 4, an state 401 of the electronic device 101 adjacent to an external electronic device 120 is illustrated. In the state 401, the electronic device 101 may detect the external electronic device 120 by using the image 410 and/or video of the camera (e.g., an outward camera 225-2 of FIGS. 2A and/or 2B). Referring to FIG. 4, in the state 401, an example of the image 410 obtained by the electronic device 101 is illustrated. The image 410 may correspond to a single image frame of the video obtained by the camera of the electronic device 101. In the image 410, the electronic device 101 may determine a portion corresponding to the external electronic device 120 based on object recognition. The embodiment is not limited thereto, and the electronic device 101 may identify the external electronic device 120 adjacent to the electronic device 101 based on a wireless communication protocol such as BLE, near field communication (NFC), and/or UWB.

In the state 401 of FIG. 4, the electronic device 101 may identify interaction between a first user 110 wearing the electronic device 101 and a second user 125 wearing the external electronic device 120. For example, the electronic device 101 may determine or identify a direction dl of the external electronic device 120 by using the image 410. Based on whether the direction dl faces the electronic device 101, the electronic device 101 may detect the interaction. For example, in case that the second user 125 looks at the first user 110 wearing the electronic device 101, the electronic device 101 may detect the direction d1 of the external electronic device 120 facing the electronic device 101. Based on detecting the direction d1 facing the electronic device 101 or facing a point adjacent to the electronic device 101, the electronic device 101 may detect interaction between the electronic device 101 and the external electronic device 120.

In an embodiment, the electronic device 101 may detect the interaction between the electronic device 101 and the external electronic device 120 based on a communication link established between the electronic device 101 and the external electronic device 120. For example, the electronic device 101 may receive an input for executing a reverse pass-through mode from the first user 110 based on a user interface (UI) (e.g., a screen 130 of FIG. 1) provided to the first user 110. The input received by the electronic device 101 is not limited to the UI. For example, the electronic device 101 may receive the input for executing the reverse pass-through mode through a button and/or a dial. Based on the input, the electronic device 101 may establish the communication link. Based on the establishment of the communication link, the electronic device 101 may execute the reverse pass-through mode, may remove appearance of the external electronic device 120 displayed on the display, or may perform an operation for displaying appearance of the second user 125 covered by the external electronic device 120 on the display.

In an embodiment, the electronic device 101 may detect the interaction between the electronic device 101 and the external electronic device 120 based on voice recognition and/or speech-to-text (STT). For example, the electronic device 101 may detect the interaction based on utterance of the first user 110 and/or the second user 125. In order to identify the utterance, the electronic device 101 may include one or more microphones. For example, the electronic device 101 may recognize a natural language sentence including a name and/or a pronoun of the first user 110 from an audio signal outputted from the one or more microphones. In response to the recognition of the natural language sentence, the electronic device 101 may detect the interaction. For example, the electronic device 101 may recognize, from the audio signal, a natural language sentence including a name and/or a pronoun of the second user 125. In response to the recognition of the natural language sentence, the electronic device 101 may detect the interaction between the electronic device 101 and the external electronic device 120.

The electronic device 101 that detected the interaction between the electronic device 101 and the external electronic device 120 may enter the reverse pass-through mode by performing the above-described operation (e.g., operations 320, 330, 340, 350 of FIG. 3) with reference to FIG. 3. In the reverse pass-through mode, the electronic device 101 may replace the appearance of the external electronic device 120 displayed on the display with a virtual object, image, and/or video representing the face of the second user 125 wearing the external electronic device 120. In the reverse pass-through mode, by displaying the entire face of the second user 125 covered by the external electronic device 120, the electronic device 101 may provide a non-verbal expression based on a facial expression of the second user 125 to the first user 110 wearing the electronic device 101. In the reverse pass-through mode, in order to support the external electronic device 120 to display the entire face of the first user 110, the electronic device 101 may transmit information related to at least a portion of the face of the first user 110 to the external electronic device 120.

In the reverse pass-through mode, the electronic device 101 may detect stop of the interaction between the external electronic device 120 and the electronic device 101. Based on the stop of the interaction, the electronic device 101 may switch to a mode different from the reverse pass-through mode. For example, the electronic device 101 may stop displaying the entire face of the second user 125 covered by the external electronic device 120.

The stop of the interaction between the electronic device 101 and the external electronic device 120 may be identified or determined based on a direction d1 of the external electronic device 120. For example, in case that the direction dl of the external electronic device 120 is directed to another point that is spaced apart (e.g., spaced apart by exceeding a designated distance) from a point where the electronic device 101 is disposed, the electronic device 101 may detect the stop of the interaction. For example, during a period in which the direction dl exceeds a designated duration, the electronic device 101 may detect the stop of the interaction in case of facing the other point spaced apart from the point where the electronic device 101 is disposed.

In an embodiment, the electronic device 101 may stop displaying the body part (e.g., at least a portion of the face) of the second user 125 covered by the external electronic device 120 in response to an input for stopping and/or terminating the reverse pass-through mode. For example, the electronic device 101 may receive or identify the input for stopping and/or terminating the reverse pass-through mode, through a visual object and/or a button (or dial) of the electronic device 101 provided through a screen. In response to the input, the electronic device 101 may switch to a mode different from the reverse pass-through mode for providing the entire face of the second user 125, and may stop providing the entire face.

In an embodiment, the electronic device 101 may switch from the reverse pass-through mode to another mode based on the utterance of users (e.g., the first user 110 and/or the second user 125) wearing the electronic device 101 and the external electronic device 120. For example, in case that the users are silent for exceeding a designated period of time, or recognize a natural language sentence (e.g., "See you next time!") indicating stop of conversation between the users, the electronic device 101 may switch from the reverse pass-through mode to the other mode. The electronic device 101 switched to the other mode may resume displaying the external electronic device 120 in the screen, or may display a UI different from the pass-through, such as VR.

As described above, according to an embodiment, the electronic device 101 may enter the reverse pass-through mode, based on the input, utterance, and/or position of the first user 110 wearing the electronic device 101. The electronic device 101 may enter the reverse pass-through mode, based on the position and/or direction of the external electronic device 120 with respect to the electronic device 101. The electronic device 101 may enter the reverse pass-through mode based on the utterance, position, and/or direction (e.g., a direction of the face of the second user 125 wearing the external electronic device 120) of the second user 125 wearing the external electronic device 120. The electronic device 101 entering the reverse pass-through mode may provide at least a portion of the face of the second user 125 covered by the external electronic device 120, by using the image 410 and information (e.g., information 150 of FIG. 1) received from the external electronic device 120.

Hereinafter, an operation of the electronic device 101 generating the virtual object, image, and/or video representing the face of the second user 125 covered by the external electronic device 120 will be described with reference to FIGS. 5, 6A, and/or 6B.

Figure 5:
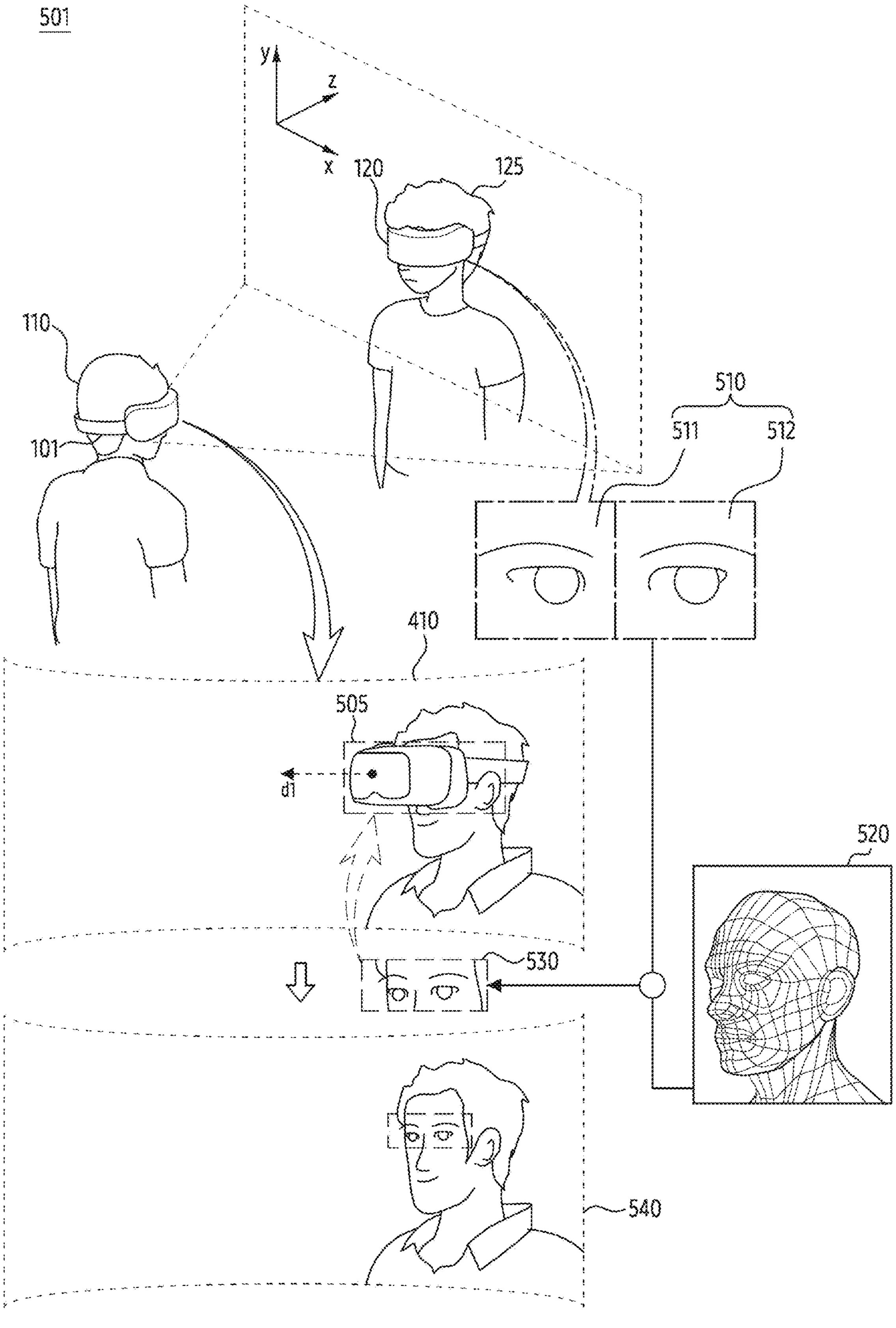
FIG. 5 illustrates an example of an operation of an HMD device that processes information received from an external HMD device according to an embodiment of the disclosure.

FIG. 5 illustrates an example of an operation of an electronic device 101 that processes information received from an external electronic device 120 according to an embodiment of the disclosure. The electronic device 101 of FIGS. 1, 2A, and 2B and/or a processor 210 of FIGS. 2A and 2B may perform the operation of the electronic device 101 described with reference to FIG. 5. The operation of the electronic device 101 described with reference to FIG. 5 may be related to operations of FIG. 3.

Referring to FIG. 5, the electronic device 101 may obtain an image 410, by using a camera (e.g., an outward camera 225-2 of FIGS. 2A and/or 2B) for capturing an external environment. In a state 501 adjacent to the external electronic device 120, the electronic device 101 may recognize the external electronic device 120 from the image 410. Based on at least one of a direction d1 of the external electronic device 120, a distance (e.g., a distance between the external electronic device 120 and the electronic device 101) from the external electronic device 120, utterance of a first user 110 and a second user 125 wearing the electronic device 101 and the external electronic device 120, the electronic device 101 may determine whether to enter a reverse pass-through mode. Before entering the reverse pass-through mode, the electronic device 101 may display the image 410 including appearance of the external electronic device 120, based on VST and/or pass-through.

Referring to FIG. 5, the state 501 in which a communication link between the external electronic device 120 and the electronic device 101 is established is illustrated. The electronic device 101 may establish the communication link in response to detecting interaction between the electronic device 101 and the external electronic device 120 by performing the above-described operation with reference to FIG. 4. Through the communication link, the electronic device 101 may receive information related to the second user 125 wearing the external electronic device 120, from the external electronic device 120.

For example, the electronic device 101 may receive three-dimensional mesh information 520 for the second user 125 from the external electronic device 120 through the communication link. The three-dimensional mesh information 520 may include information required for three-dimensional rendering with respect to a body part (e.g., a face and/or a head) of the second user 125. For example, the three-dimensional mesh information 520 may include vertices (or voxels) corresponding to each point (or landmarks) of the face of the second user 125. The three-dimensional mesh information 520 may include information for forming fragments (or unit planes) based on the connection of at least three or more vertices. The three-dimensional mesh information 520 may include information on textures to be filled in each of the fragments. The textures may be generated based on a three-dimensional scan of the external electronic device 120 with respect to the body part of the second user 125.

Similar to the three-dimensional mesh information 520 received from the external electronic device 120, the electronic device 101 may obtain or generate three-dimensional mesh information on the first user 110, based on a three-dimensional scan of the first user 110 wearing the electronic device 101. For example, the electronic device 101 may obtain the three-dimensional mesh information on the first user 110 by performing the operation 310 of FIG. 3. The electronic device 101 may obtain the three-dimensional mesh information on the first user 110 from an image and/or video of a camera (e.g., a camera 225 and/or an eye tracking camera 225-1 of FIGS. 2A and/or 2B) of the electronic device 101, by using a deep-learning model. The three-dimensional mesh information may include geometry and/or texture of a body part (e.g., a head) of the first user 110. The three-dimensional mesh information on the first user 110 may be transmitted to the external electronic device 120 through the communication link.

Referring to FIG. 5, the electronic device 101 may receive the three-dimensional mesh information 520 and gaze information 510 of the second user 125 from the external electronic device 120. The gaze information 510 may include images 511 and 512 of the two eyes of the second user 125. An image 511 corresponding to a right eye of the second user 125 and an image 512 corresponding to a left eye of the second user 125 are illustrated as an example of the gaze information 510, but the embodiment is not limited thereto. For example, the gaze information 510 may include parameters indicating directions of the two eyes of the second user 125 calculated by the external electronic device 120.

According to an embodiment, the electronic device 101 may change a portion corresponding to the gaze information 510 in three-dimensional mesh generated (or reconstructed) by the three-dimensional mesh information 520 received from the external electronic device 120. For example, the electronic device 101 may change a vertex and/or texture related to the two eyes of the second user 125 in the three-dimensional mesh. For example, the image 512 corresponding to the left eye in the gaze information 510 may be determined as at least one texture corresponding to the left eye in the three-dimensional mesh. For example, the image 511 corresponding to the right eye in the gaze information 510 may be determined as at least one texture corresponding to the right eye in the three-dimensional mesh. The three-dimensional mesh generated based on the gaze information 510 and the three-dimensional mesh information 520 may be referred to as a three-dimensional avatar and/or a virtual object for the second user 125.

According to an embodiment, while displaying the image 410 (or video) on the display based on the VST, the electronic device 101 may display at least a portion of the virtual object for the second user 125 based on the reverse pass-through mode. The electronic device 101 may display at least a portion of the virtual object, based on detecting the interaction between the electronic device 101 and the external electronic device 120. For example, in a virtual object representing a head wearing the external electronic device 120, the electronic device 101 may display a portion 530 of the virtual object in which eyes having a direction indicated by the gaze information 510 are disposed, on a display.

Referring to FIG. 5, the electronic device 101 may display the portion 530 of the virtual object by overlapping on a portion 505 corresponding to the external electronic device 120 in the image 410. The electronic device 101 may display the portion 530 of a virtual object rotated (or aligned) based on the direction dl of the external electronic device 120 identified from the image 410 on the portion 505 of the image 410. In the screen 540 displayed on the display of the electronic device 101, since the portion 530 of the virtual object overlaps the portion 505 of the image 410, the entire facial expression of the second user 125 may be reconstructed.

The electronic device 101 may compare a landmark included in the virtual object and a landmark of a face recognized in the image 410 to match the portion 530 of the virtual object with the portion 505 in the image 410. The landmark may include designated points (e.g., both ends of the eye) in the body part, such as the face. The electronic device 101 may determine the portion 505 related to the portion 530 of the virtual object based on feature points (or key points) extracted from the image 410.

An embodiment of restoring the appearance of the body part covered by the external electronic device 120 using the gaze information 510 has been described, but the embodiment is not limited thereto. For example, the electronic device 101 may generate and/or display a virtual object for at least a portion of the body part of the second user 125 covered by the external electronic device 120, by using at least one of the direction of the gaze of the user wearing the electronic device 101, the distance between the electronic device 101 and the external electronic device 120, the appearance of the body part (e.g., the two eyes of the second user 125) covered by the external electronic device 120 estimated using the microphone of the electronic device 101, and/or the image and/or video pre-stored in the electronic device 101.

As described above, according to an embodiment, the electronic device 101 may render a virtual object for the second user 125 wearing the external electronic device 120 in three dimensions in order to provide the appearance of the body part covered by the external electronic device 120 in the screen 540. The electronic device 101 may perform rendering on the virtual object, based on the mesh information 520 including the face of the second user 125 and the gaze information 510 repeatedly (or periodically) transmitted from the external electronic device 120. By displaying the portion 530 of the virtual object, the electronic device 101 may provide the appearance of the body part covered by the external electronic device 120.

In an embodiment, the electronic device 101 may infer the appearance of the body part beyond the portion 505 corresponding to the external electronic device 120, by using a neural network. Hereinafter, an operation of the electronic device 101 for inferring the appearance of the body part of the second user 125 covered by the external electronic device 120 based on the neural network will be described with reference to FIGS. 6A and/or 6B.

Figure 6A:
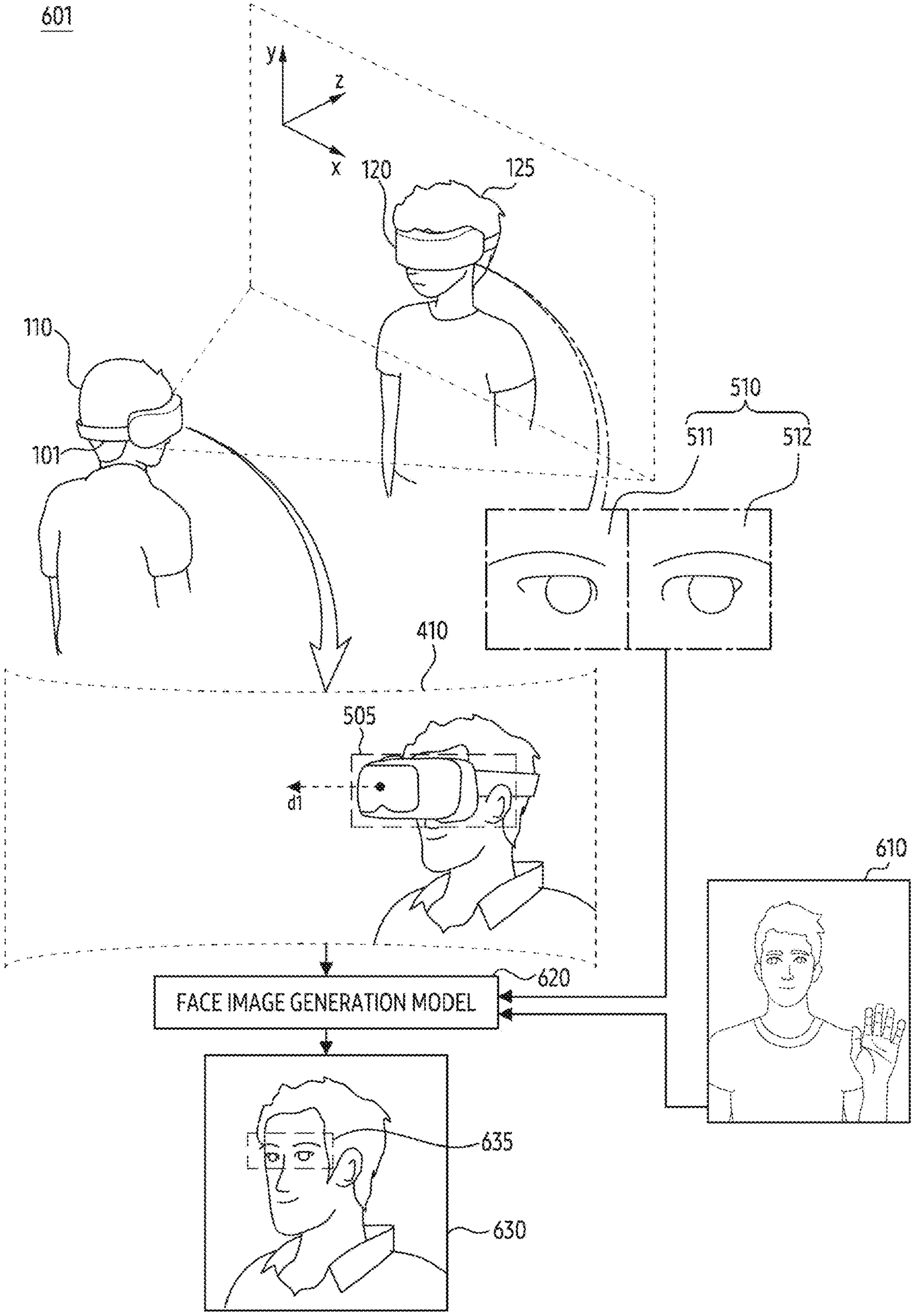
FIGS. 6A and 6B illustrate an example of an operation of an HMD device that processes information received from an external HMD device according to various embodiments of the disclosure.
Figure 6B:
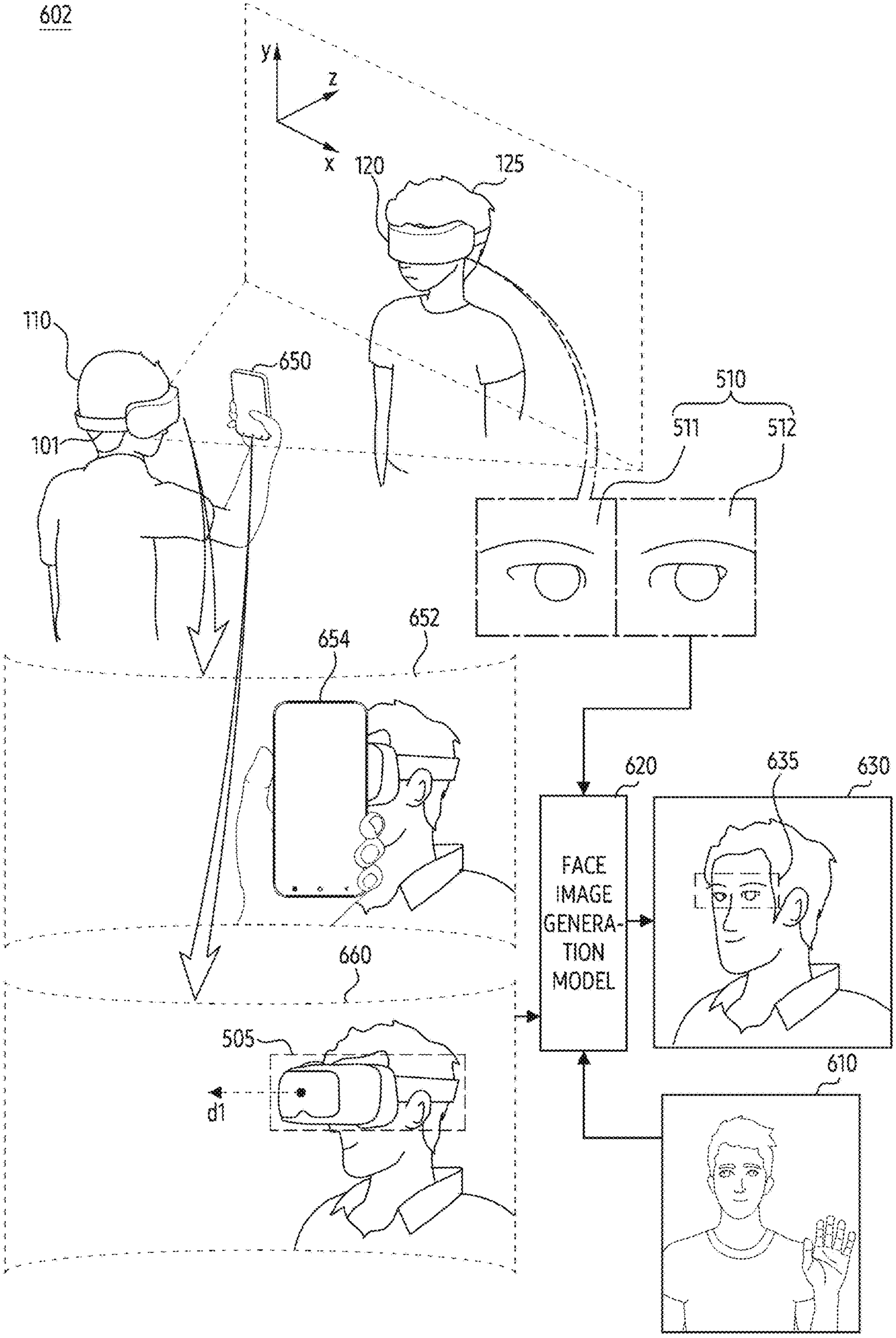

FIGS. 6A and 6B illustrate an example of an operation of an electronic device 101 that processes information received from an external electronic device 120 according to various embodiments of the disclosure. The electronic device 101 of FIGS. 1, 2A, and 2B and/or a processor 210 of FIGS. 2A and 2B may perform the operation of the electronic device 101 described with reference to FIGS. 6A and/or 6B. The operation of the electronic device 101 described with reference to FIGS. 6A and/or 6B may be related to operations of FIG. 3.

Referring to a state 601 of FIG. 6A, the electronic device 101 may obtain an image 410 of an external environment, by using a camera (e.g., an outward camera 225-2 of FIGS. 2A and/or 2B). The image 410 may correspond to any one of image frames continuously obtained through the camera. While providing a user experience based on VST and/or pass-through, the electronic device 101 may display at least a portion of the image 410 on a display (e.g., a display 220 of FIGS. 2A and/or 2B). The electronic device 101 that detected interaction between the electronic device 101 and the external electronic device 120 may identify a portion 505 corresponding to the external electronic device 120 in the image 410.

According to an embodiment, the electronic device 101 may perform synthesis (e.g., inpainting) on the portion 505 corresponding to the external electronic device 120 in the image 410. The synthesis may include combining, replacing, or overlapping a virtual object, image, and/or video of the body part (e.g., at least a portion of a face including two eyes) of a second user 125 covered by the external electronic device 120 on the portion 505. The synthesis may be performed based on execution of a face image generation model 620. The electronic device 101 that executed an eye image generator 294 of FIG. 2B may generate or obtain an image and/or video to be synthesized on the portion 505 of the image 410, by using the face image generation model 620.

Referring to FIG. 6A, the electronic device 101 may input at least one of the image 410, gaze information 510, and/or an image 610 related to the second user 125 obtained from an outward camera of the electronic device 101, to the face image generation model 620. The image 610 may be received from the external electronic device 120 through a communication link established between the electronic device 101 and the external electronic device 120. The image 610 may include at least a portion corresponding to the face of the second user 125 wearing the external electronic device 120. The gaze information 510 may be repeatedly and/or continuously received from the external electronic device 120 through the communication link. The gaze information 510 including images 511 and 512 of the two eyes of the second user 125 is exemplarily illustrated, but the embodiment is not limited thereto. The gaze information 510 may be referred to as gaze tracking information.

According to an embodiment, the electronic device 101 may obtain an image 630 related to the face of the second user 125 wearing the external electronic device 120 from the face image generation model 620 in which at least one of the images 410 and 610 and the gaze information 510 is inputted. The face image generation model 620 may include a neural network for rendering the face. For example, the face image generation model 620 may be trained to output the image 630 related to a face having the appearance of the face indicated by the image 610, including eyes having a direction indicated by the gaze information 510, and facing in the direction dl of the face represented by the image 410. The face image generation model 620 may include a generative model, such as a generative adversarial network (GAN). The face image generation model 620 may include a model for generating graphic information (e.g., the image 630) from non-graphical information such as text, such as a diffusion model (e.g., a stable diffusion model). The face image generation model 620, like the image 630, may be trained to output an image including not only the face but also a background.

Referring to FIG. 6A, the electronic device 101 that obtained the image 630 from the face image generation model 620 may segment or extract a portion 635 corresponding to the external electronic device 120 in the image 630. The electronic device 101 may replace the portion 505 corresponding to the external electronic device 120 with the portion 635 extracted from the image 630 in the image 410 to be displayed on the display. The electronic device 101 may perform alignment between the image 410 and the portion 635 based on feature points (or landmarks of the face indicated by the feature points) for the face of the second user 125 identified from the image 410.

In an embodiment, by displaying the image 410 including the portion 505 replaced with the portion 635, the electronic device 101 may provide the first user 110 with the entire face of the second user 125 wearing the external electronic device 120. Based on the entire face, the electronic device 101 may provide a nonverbal expression of the second user 125 to the first user 110. In order to support the external electronic device 120 to provide the nonverbal expression of the first user 110 to the second user 125, the electronic device 101 may transmit, to the external electronic device 120, at least one of an image of the face of the first user 110 and/or the gaze information related to the two eyes of the first user 110.

Referring to a state 602 of FIG. 6B, an image 652 of the external environment obtained by the electronic device 101 using the camera is illustrated. In case that a mobile phone 654 is disposed between the electronic device 101 and the external electronic device 120, the image 652 having appearance in which the external electronic device 120 is covered by the mobile phone 654 may be obtained in the image 652. In an embodiment of obtaining the image 652 of FIG. 6B, the electronic device 101 may not identify the external electronic device 120 by using the image 652.

In an embodiment of FIG. 6B, the electronic device 101 may detect the external electronic device 120, by using an image 660 of the mobile phone 654 connected to the electronic device 101 (e.g., account information of the first user 110 is logged in). For example, the electronic device 101 may detect the mobile phone 654 located in a front surface of the electronic device 101, by using a positioning protocol such as UWB. To the detected mobile phone 654, the electronic device 101 may transmit a signal for obtaining the image from the camera of the mobile phone 654. Based on the signal, the electronic device 101 that obtained the image 660 captured by the mobile phone 654 may detect the portion 505 corresponding to the external electronic device 120 in the image 660.

In an embodiment of FIG. 6B, the electronic device 101 that detected the portion 505 covered by the external electronic device 120 from the image 660 obtained from the mobile phone 654 may execute a function for synthesizing an image and/or video indicating the body part (e.g., at least a portion of the face including the two eyes) of the second user 125 wearing the external electronic device 120 on a portion corresponding to the portion 505, in the image 652. The synthesis may be performed based on execution of the face image generation model 620. For example, the electronic device 101 may input at least one of the image 660, the gaze information 510, and/or the image 610 related to the second user 125 obtained from the mobile phone 654, to the face image generation model 620. The image 610 and/or the gaze information 510 may be transmitted to the electronic device 101, based on the operations of the electronic device 101 and/or the external electronic device 120 described above with reference to FIG. 6A.

Referring to FIG. 6B, the electronic device 101 may obtain the image 630 representing the face of the second user 125, by using the face image generation model 620. In the image 630, by using the portion 635 corresponding to the portion 505 of the image 660, the electronic device 101 may replace, change, or update a portion corresponding to the external electronic device 120 in the image 652.

As described above, according to an embodiment, the electronic device 101 may visualize the body part (e.g., a portion of the face in which the two eyes are disposed) of a counterpart (e.g., the second user 125) covered by the external electronic device 120, by using the image 630 obtained from the 3 dimensional graphical object of FIG. 5 (e.g., a virtual object based on mesh information 520) and/or a neural network of FIGS. 6A and/or 6B (e.g., the face image generation model 620). The electronic device 101 may optimize calculation amount for visualizing the body part of the counterpart. For example, in case that interaction (e.g., conversation) between the first user 110 and the second user 125 is interrupted, and/or a size of a portion (e.g., the portion 505 of the image 410) corresponding to the external electronic device 120 on the display is reduced, the electronic device 101 may reduce calculation amount for inferring the face of the second user 125 covered by the external electronic device 120.

Hereinafter, an operation of the electronic device 101 for optimizing the calculation amount will be described with reference to FIGS. 7A and 7B.

Figure 7A:
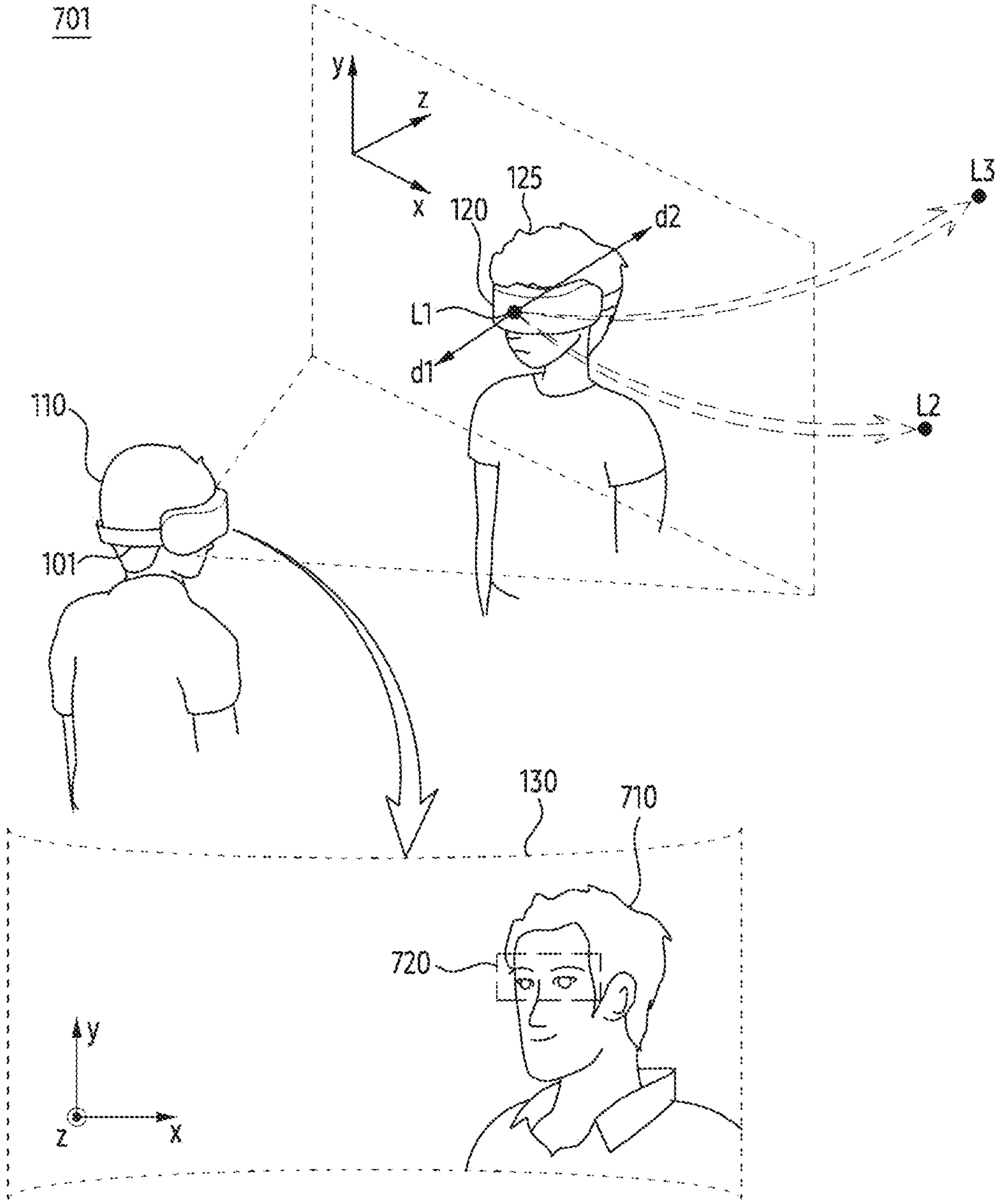
FIGS. 7A and 7B illustrate an example of an operation of an HMD device according to various embodiments of the disclosure.
Figure 7B:
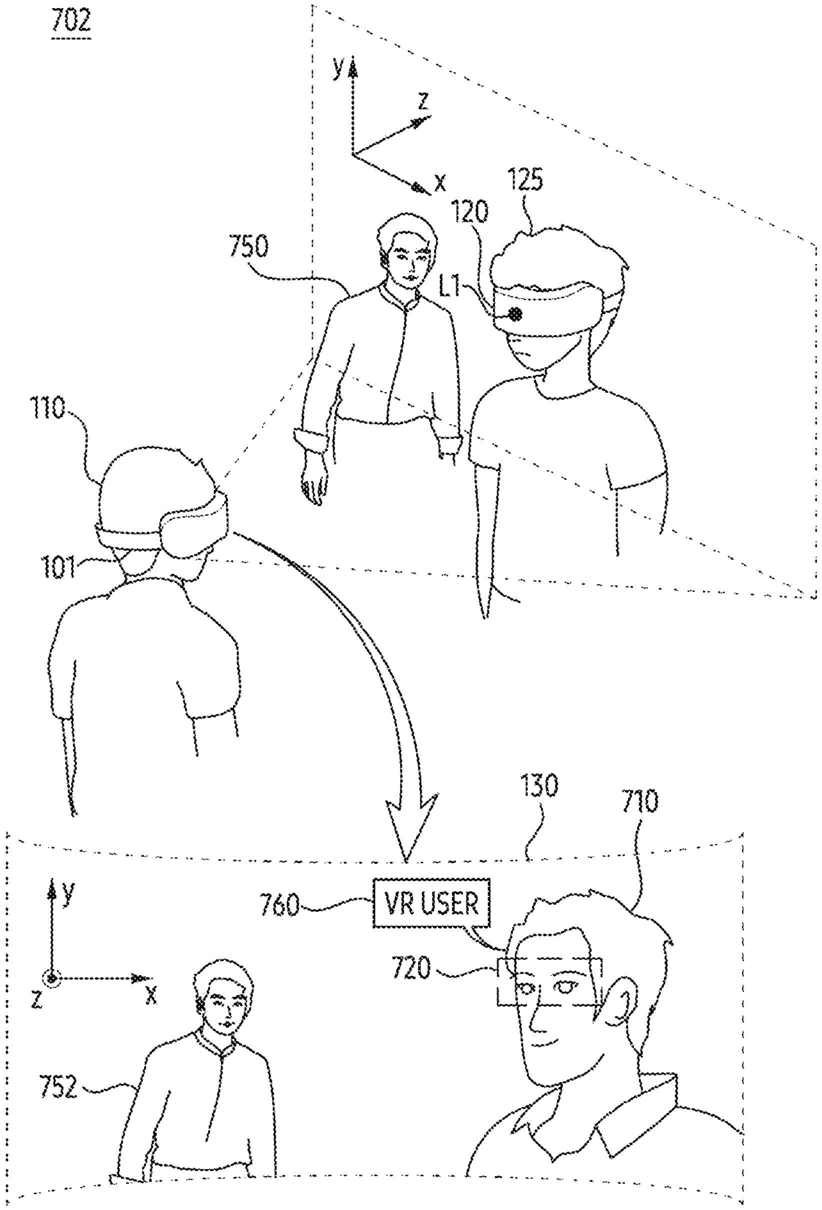

FIGS. 7A and 7B illustrate an example of an operation of an electronic device 101 according to various embodiments of the disclosure. The electronic device 101 of FIGS. 1, 2A, and 2B and/or a processor 210 of FIGS. 2A and 2B may perform the operation of the electronic device 101 described with reference to FIGS. 7A and 7B. The operation of the electronic device 101 described with reference to FIGS. 7A and 7B may be related to operations of FIG. 3.

Referring to FIG. 7A, a state 701 of the electronic device 101 that removes appearance of an external electronic device 120 and provides a screen 130 including appearance of a face of a second user 125 covered by the external electronic device 120 is illustrated. The state 701 of the electronic device 101 may be related to a reverse pass-through mode. Based on at least one of the three-dimensional rendering and/or a face image generation model 620 of FIGS. 6A and 6B using mesh information 520 and/or gaze information 510 of FIG. 5, the electronic device 101 may display the screen 130 including the appearance of the entire face of the second user 125.

Referring to FIG. 7A, a position of a visual object 710 corresponding to the second user 125 in the screen 130 may correspond to a position L1 of the second user 125 and/or the external electronic device 120. Based on a direction dl of the second user 125 and/or the external electronic device 120, the electronic device 101 may display a virtual object, image, and/or video representing at least a portion of the face of the second user 125 covered by the external electronic device 120 on a portion 720 corresponding to the external electronic device 120 in the screen 130. As illustrated in the screen 130 of FIG. 7A, a first user 110 wearing the electronic device 101 may view an external environment in which the external electronic device 120 is removed based on the virtual object, the image, and/or the video.

Based on movement and/or rotation of the first user 110 wearing the electronic device 101 and/or the second user 125 wearing the external electronic device 120 in the state 701 of FIG. 7A, a positional relationship between the electronic device 101 and the external electronic device 120 may be changed. The change in the positional relationship may cause a change in a size of the portion 720 corresponding to the external electronic device 120 in the screen 130.

For example, in case that the second user 125 rotates his or her head, a direction of the external electronic device 120 may be changed from the direction dl of FIG. 7A to a direction d2. In case that the external electronic device 120 faces the direction d2, since a rear surface of the second user 125 faces the electronic device 101, the size of the portion 720 corresponding to the external electronic device 120 may be substantially reduced to zero. For example, in case that the second user 125 moves, the position and/or size of the portion 720 corresponding to the external electronic device 120 in the screen 130 may be changed. For example, as the second user 125 moves, in case that the position of the external electronic device 120 is moved from the position L1 to a position L2, since the second user 125 is moved out of the field-of-view (FoV) of a camera (e.g., an outward camera 225-2 of FIGS. 2A and/or 2B) of the electronic device 101, the size of the portion 720 corresponding to the external electronic device 120 in the screen 130 may be substantially reduced to zero. For example, as the second user 125 moves, in case that the position of the external electronic device 120 moves from the position L1 to a position L3 in a direction (e.g., a +z axis direction) away from the electronic device 101, the size of the portion 720 corresponding to the external electronic device 120 in the screen 130 may be reduced.

According to an embodiment, the electronic device 101 may determine the size of the portion 720 corresponding to the external electronic device 120 in the screen 130, based on at least one of a distance from the external electronic device 120 or a direction (e.g., an azimuth angle) of the external electronic device 120 with respect to the electronic device 101. The distance from the external electronic device 120 may include a distance between the electronic device 101 and the external electronic device 120. The distance may be obtained or calculated based on object recognition based on an image obtained from the camera. The electronic device 101 may calculate the distance, based on a wireless communication protocol such as BLE and/or UWB.

According to an embodiment, the electronic device 101 may determine a size and/or resolution of an image (e.g., an image 630 of FIGS. 6A and/or 6B) to be synthesized to express a body part (e.g., at least a portion of a face including two eyes) of the second user 125 covered by the external electronic device 120, based on the size of the portion 720 corresponding to the external electronic device 120. For example, the electronic device 101 may synthesize an image having the determined size and/or resolution, by selectively driving any one of different models (e.g., a face image generation model 620 of FIGS. 6A and 6B) for synthesizing images of different sizes (or resolutions). Calculation amount required for driving the models may be related to the size and/or resolution of the image to be synthesized by each of the models. For example, as the size and/or resolution of the image to be synthesized by the model increases, the calculation amount performed to drive the model may increase. The number of weights and/or parameters included in the model may increase as the size and/or resolution of the image to be synthesized by the model increases.

The electronic device 101 including models corresponding to each of the different sizes may generate an image to be synthesized on the portion 720, by driving any one model corresponding to the size and/or resolution of the portion 720. Since the size of the portion 720 is changed by the distance and/or direction between the electronic device 101 and the external electronic device 120, the electronic device 101 may select or identify any one model among a plurality of models, at least based on the size of the portion 720. By using the selected model, the electronic device 101 may obtain or generate at least a portion of an image to be displayed on the portion 720 in the screen 130. The electronic device 101 that selects a different model based on the size of the portion 720 may adaptively adjust calculation amount performed to synthesize or generate an image to be displayed on the portion 720 based on the selection of the model.

According to an embodiment, the electronic device 101 may adjust amount of a graphical resource of a three-dimensional virtual object corresponding to the second user 125 based on the size of the portion 720 corresponding to the external electronic device 120. The three-dimensional virtual object may include a virtual object rendered by the mesh information 520 and/or the gaze information 510 of FIG. 5. The graphical resource may include vertices and/or textures included in the mesh information 520. For example, the electronic device 101 may adjust the number of vertices and/or textures of the virtual object based on the size of the portion 720. For example, the electronic device 101 may adjust the size of each of the textures based on the size of the portion 720. For example, in case that the size of the portion 720 decreases, the electronic device 101 may reduce the amount of the graphical resource for the virtual object based on the texture regression.

For example, the electronic device 101 may change a frequency and/or period of performing rendering the three-dimensional virtual object corresponding to the second user 125 based on the size of the portion 720. For example, in case that the size of the portion 720 is reduced, the electronic device 101 may increase the period of performing the rendering. Independently of the period, the electronic device 101 may maintain a period in which a portion (e.g., a portion 530 of FIG. 5) of the three-dimensional virtual object is displayed on the portion 720 of the screen 130. For example, the electronic device 101 may maintain a portion of the three-dimensional virtual object and a period for aligning the portion 720 independently of the period for performing the rendering the three-dimensional virtual object.

According to an embodiment, the electronic device 101 may change a period (e.g., frames per second (FPS)) of the camera (e.g., an eye tracking camera 225-1 and/or the outward camera 225-2 of FIGS. 2A and/or 2B), based on at least one of the distance from the external electronic device 120 and/or the direction of the external electronic device 120 with respect to the electronic device 101. For example, as the distance between the electronic device 101 and the external electronic device 120 increases, and/or the direction (e.g., the directions d1 and d2) of the external electronic device 120 changes, the size of the portion 720 corresponding to the external electronic device 120 in the screen 130 may change. The electronic device 101 that identified that the size of the portion 720 is changed may control the camera based on a period corresponding to the changed size. For example, as the size of the portion 720 decreases, the period related to the control of the camera may increase. As the size of the portion 720 decreases, FPS of a video obtained from the camera may decrease, or the number of images (e.g., the number per unit time) may decrease. Since the number of images is reduced, a frequency at which an operation for replacing the appearance of the external electronic device 120 is performed may be reduced.

According to an embodiment, the electronic device 101 may change a period of receiving information from the external electronic device 120, based on at least one of the distance from the external electronic device 120 and/or the direction of the external electronic device 120 with respect to the electronic device 101. The information received from the external electronic device 120 may include the gaze information 510 of FIGS. 5, 6A, and/or 6B. For example, in case that the size of the portion 720 corresponding to the external electronic device 120 in the screen 130 decreases based on the distance and/or the direction, the electronic device 101 may increase the period. Since the electronic device 101 receives information based on the increased period, current consumption of a circuit (e.g., a communication circuit 235 of FIGS. 2A and/or 2B) activated to receive the information may be reduced.

A condition under which the above-described operation of the electronic device 101 is performed with reference to FIG. 7A is not limited to the positional relationship (e.g., the distance and/or the direction) between the electronic device 101 and the external electronic device 120. For example, the electronic device 101 may stop or limit an operation for replacing the portion 720 corresponding to the external electronic device 120, based on a user input indicating termination and/or stop of the reverse pass-through mode. For example, the electronic device 101 may reduce the size (or resolution) of the virtual object, image and/or video to be synthesized in the portion 720, or increase a period of obtaining information required for the synthesis of the virtual object, image and/or video, based on information related to utterance (e.g., frequency, speed, and/or the number of utterance) of users (e.g., the first user 110 and/or the second user 125) wearing each of the electronic device 101 and the external electronic device 120.

The operation of the electronic device 101 based on the positional relationship between the electronic device 101 and the external electronic device 120 is not limited to the above-described embodiment. For example, while displaying the screen 130 based on the reverse pass-through mode, the electronic device 101 may provide a visual effect indicating whether the second user 125 wearing the external electronic device 120 gazes at the electronic device 101 and/or the first user 110 wearing the electronic device 101, based on the direction dl of the external electronic device 120. For example, in case that the direction d1 of the external electronic device 120 faces the electronic device 101, the electronic device 101 may emphasize the visual object 710 corresponding to the second user 125, in the screen 130. The operation of emphasizing the visual object 710 may include an operation of adjusting the color, brightness, and/or saturation of the visual object 710. The operation of emphasizing the visual object 710 may include an operation of displaying a figure (e.g., a figure having a designated transparency and/or a designated color) having a shape that surrounds at least a portion of the visual object 710.

Referring to FIG. 7B, a state 702 of the electronic device 101 that provides the screen 130 including the appearance of the face of the second user 125 covered (or hidden or concealed) by the external electronic device 120 is illustrated. In the state 702, the electronic device 101 may display the screen 130 related to the reverse pass-through mode.

Referring to FIG. 7B, an external image of the user 110 wearing the electronic device 101 may include the visual object 710 corresponding to the second user 125 wearing the external electronic device 120 as well as a visual object 752 corresponding to a third user 750 of a front direction of the user 110. The electronic device 101 may display an image representing at least a portion of the face of the second user 125 (e.g., a portion of the face including the two eyes of the second user 125) hidden by the external electronic device 120 on the portion 720 corresponding to the external electronic device 120, by using the information transmitted from the external electronic device 120.

Referring to the screen 130 of FIG. 7B, while displaying all faces of the second user 125 and the third user 750 wearing the external electronic device 120 through the screen 130, the electronic device 101 may display a visual object 760 for indicating the second user 125 wearing the external electronic device 120 among users (e.g., the second user 125 and/or the third user 750) visible through the screen 130. For example, in the screen 130, the visual object 760 including designated text such as "VR user" may be displayed on the visual object 710 corresponding to the second user 125 wearing the external electronic device 120. By displaying the visual object 760 having a position in the screen 130 linked with the visual object 710, the electronic device 101 may guide or notify that the second user 125 corresponding to the visual object 710 wears the external electronic device 120.

As described above, according to an embodiment, the electronic device 101 may operate in the reverse pass-through mode in order to support transmission of a nonverbal expression based on a facial expression. For example, electronic devices disposed toward each other (e.g., the electronic device 101 and/or the external electronic device 120) may exchange information for replacing appearances of electronic devices in the screen (e.g., the screen 130) of each of the electronic devices, based on the reverse pass-through mode. The information may be generated to visualize body parts (e.g., portions of faces of users wearing each of the electronic devices) covered by each of the electronic devices.

Hereinafter, an operation of the electronic devices performed for exchanging the information will be described with reference to FIG. 8.

Figure 8:
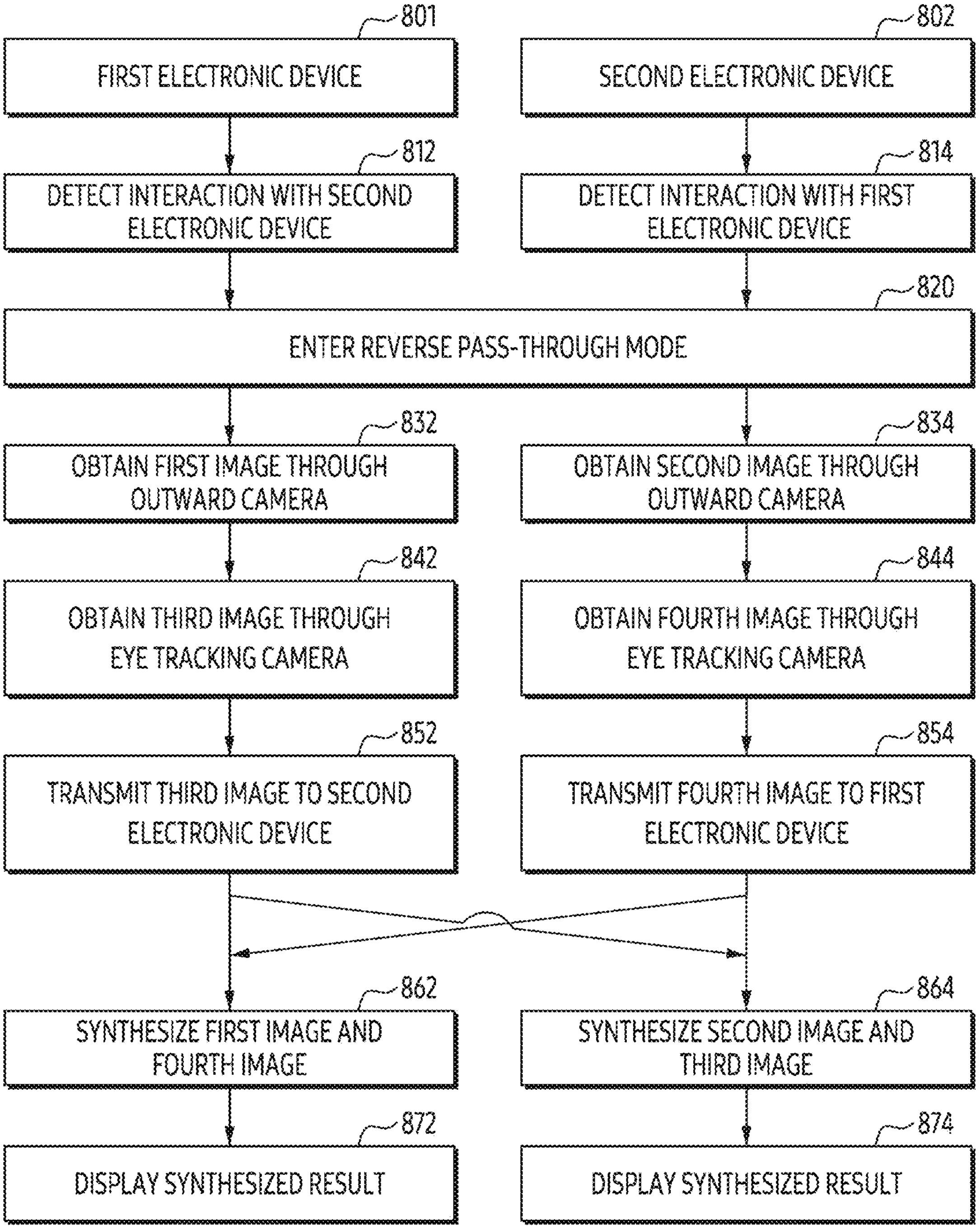
FIG. 8 illustrates a signal flow diagram between HMD devices according to an embodiment of the disclosure.

FIG. 8 illustrates a signal flow diagram between electronic devices (e.g., a first electronic device 801 and/or a second electronic device 802) according to an embodiment of the disclosure. Each of the first electronic device 801 and the second electronic device 802 of FIG. 8 may correspond to each of the electronic device 101 and the external electronic device 120 described with reference to FIGS. 1, 2A, 2B, 3 to 5, 6A, 6B, 7A, and/or 7B. An operation of the first electronic device 801 and/or the second electronic device 802 described with reference to FIG. 8 may be performed by a processor 210 of FIGS. 2A and/or 2B.

Referring to FIG. 8, in operation 812, according to an embodiment, a processor of the first electronic device 801 may detect interaction with the second electronic device 802. Similar to the operation 812, in operation 814, according to an embodiment, a processor of the second electronic device 802 may detect interaction with the first electronic device 801. The interaction may be detected based on a user input for executing a reverse pass-through mode, as described above with reference to FIG. 4.

Referring to FIG. 8, in operation 820, according to an embodiment, the first electronic device 801 and the second electronic device 802 may enter the reverse pass-through mode. While displaying an image and/or a video of an external environment based on the pass-through, the first electronic device 801 and the second electronic device 802 may enter the reverse pass-through mode of the operation 820. Based on entering the reverse pass-through mode, a communication link may be established between the first electronic device 801 and the second electronic device 802. Through the communication link, the processor of the first electronic device 801 may transmit, to the second electronic device 802, information (e.g., three-dimensional mesh information and/or one or more photos) related to a face of a first user (e.g., a first user 110 of FIGS. 1, 2A, 2B, 3 to 5, 6A, 6B, 7A, and/or 7B) wearing the first electronic device 801. Similarly, through the communication link, the processor of the second electronic device 802 may transmit, to the first electronic device 801, information related to a face of a second user (e.g., a second user 125 of FIGS. 1, 2A, 2B, 3 to 5, 6A, 6B, 7A, and/or 7B) wearing the second electronic device 802. In the operation 820, information for rendering users' faces may be exchanged between the first electronic device 801 and the second electronic device 802.

In the reverse pass-through mode, based on operation 832, the first electronic device 801 may obtain a first image through an outward camera (e.g., an outward camera 225-2 of FIGS. 2A and/or 2B). The first image may correspond to an external environment of a front surface of the first electronic device 801. In the first image, the processor of the first electronic device 801 may confirm a portion corresponding to the second electronic device 802.

Similarly, in operation 834, the second electronic device 802 may obtain a second image through the outward camera. The second image may correspond to an external environment of a front surface of the second electronic device 802. In an embodiment in which the first electronic device 801 and the second electronic device 802 are disposed toward each other, the second electronic device 802 may identify or confirm a portion corresponding to the first electronic device 801 in the second image.

Referring to FIG. 8, in operation 842, according to an embodiment, the processor of the first electronic device 801 may obtain a third image through an eye tracking camera (e.g., an eye tracking camera 225-1 of FIGS. 2A and/or 2B). The third image may be an image of at least one of two eyes of the first user wearing the first electronic device 801. Based on the third image, the processor of the first electronic device 801 may obtain or calculate a direction of the first user's gaze.

Referring to FIG. 8, in operation 844, according to an embodiment, the processor of the second electronic device 802 may obtain a fourth image through the eye tracking camera. The fourth image may correspond to at least one of two eyes of the second user wearing the second electronic device 802. Based on the fourth image, the processor of the second electronic device 802 may generate or obtain information indicating a direction of the second user's gaze.

Referring to FIG. 8, in operation 852, according to an embodiment, the processor of the first electronic device 801 may transmit the third image of the operation 842 to the second electronic device 802 via the communication link established based on the reverse pass-through mode of the operation 820. The embodiment is not limited thereto, and the first electronic device 801 may transmit information indicating the direction of the first user's gaze, obtained based on the third image, to the second electronic device 802. In the reverse pass-through mode, the first electronic device 801 may repeatedly perform the operation 852. Based on the repetitively performed operation 852, the first electronic device 801 may notify the second electronic device 802 of information related to the gaze of the first user in real time. The embodiment is not limited thereto, and the processor of the first electronic device 801 may transmit an image representing the entire face of the first user. The image transmitted to the second electronic device may at least partially include the third image obtained based on the operation 842.

Referring to FIG. 8, in the operation 854, according to an embodiment, the processor of the second electronic device 802 may transmit the fourth image of the operation 844 to the first electronic device 801 via the communication link. Transmitting to the first electronic device 801 is not limited to the fourth image. For example, the processor of the second electronic device 802 may transmit information related to the gaze of the second user, obtained from the fourth image, to the first electronic device 801. The second electronic device 802 may periodically (or repeatedly) perform the operation 854 in the reverse pass-through mode. The embodiment is not limited thereto, and the processor of the second electronic device 802 may transmit an image representing the entire face of the second user. The image transmitted to the first electronic device may at least partially include the fourth image obtained based on the operation 844.

The information transmitted by the first electronic device 801 and the second electronic device 802 in the operations 852 and 854 may transmit an image of the entire face of the user of the electronic device as well as the image obtained through the eye tracking camera. For example, the first electronic device 801 may transmit an image and/or video representing the user's face covered by the first electronic device 801 to the second electronic device 802.

Referring to FIG. 8, in operation 862, according to an embodiment, the processor of the first electronic device 801 may synthesize the first image and the fourth image. For example, the first electronic device 801 may combine the fourth image with a portion corresponding to the second electronic device 802 in the first image. As the first image and the fourth image are combined, the fourth image representing the two eyes of the second user covered by the second electronic device 802 may be disposed on a portion corresponding to the second electronic device 802 in the first image. The embodiment is not limited thereto, and the first electronic device 801 may generate a virtual image for at least a portion of the face including the two eyes of the second user from the fourth image, by using a three-dimensional virtual object and/or a neural network (e.g., a face image generation model 620 of FIGS. 6A and/or 6B) as described above with reference to FIGS. 5, 6A, and 6B. The first electronic device 801 may combine the generated virtual image with the first image.

Referring to FIG. 8, in operation 864, according to an embodiment, the processor of the second electronic device 802 may synthesize the second image and the third image. For example, the second electronic device 802 may perform the operation 864 to reconstruct the face (e.g., a portion of the face including two eyes) of the first user covered by the first electronic device 801 in the second image related to the external environment. The processor of the second electronic device 802 may replace the portion covered by the first electronic device 801 in the second image with a virtual object, image, and/or video representing the face of the first user, by performing the operation of the electronic device 101 described above with reference to FIGS. 5, 6A, and/or 6B.

Referring to FIG. 8, in operation 872, according to an embodiment, the processor of the first electronic device 801 may display a result synthesized based on the operation 862 on a display (e.g., a display 220 of FIGS. 2A and/or 2B) of the first electronic device 801. For example, the first electronic device 801 may display the first image (e.g., an image of an external environment including the second electronic device 802) in which the fourth image (e.g., an image representing the two eyes of the second user wearing the second electronic device 802) is synthesized. The first electronic device 801 may perform the operations 862 and 872 of FIG. 8 for image frames continuously obtained through the outward camera in the reverse pass-through mode.

Referring to FIG. 8, in operation 874, according to an embodiment, the processor of the second electronic device 802 may display the result synthesized based on the operation 864 on the display. The second electronic device 802 may display a second image (e.g., an image corresponding to an external environment including the first electronic device 801) in which the third image (e.g., an image related to the two eyes of the first user wearing the first electronic device 801) is synthesized. The second electronic device 802 may perform the operations 864 and 874 of FIG. 8 for each of the image frames continuously obtained through the outward camera in the reverse pass-through mode.

Referring to FIG. 8, each of the first electronic device 801 and the second electronic device 802 may repeatedly perform each of the operations 832, 842, 852, 862, and 872 and operations 834, 844, 854, 864, and 874 after entering the reverse pass-through mode of the operation 820. In case of switching to another mode different from the reverse pass-through mode, the first electronic device 801 may stop repeatedly performing the operations 832, 842, 852, 862, and 872. The other mode may include, for example, a mode for providing a user experience disconnected from the external environment, such as a VR mode. The first electronic device 801 may switch from the reverse pass-through mode to the other mode, in response to the stop of the interaction detected based on the operation 812. As described above with reference to FIG. 4, the first electronic device 801 may switch from the reverse pass-through mode to the other mode, based on the distance and/or direction between the first electronic device 801 and the second electronic device 802.

Referring to FIGS. 1, 2A, 2B, 3 to 5, 6A, 6B, 7A, 7B, and 8, two electronic devices are described, but the embodiment is not limited thereto. For example, each of the three electronic devices may execute a function to remove from, in the field-of-view (FoV), another electronic device that covers the body part in the field-of-view (FoV), by using the reverse pass-through mode. Referring to FIGS. 1, 2A, 2B, 3 to 5, 6A, 6B, 7A, 7B, and 8, the operation of the first electronic device 801 for synthesizing the faces of the second user wearing the second electronic device 802 has been described, but the embodiment is not limited thereto. For example, the second electronic device 802 may transmit the virtual object, image, and/or video of the face of the second user wearing the second electronic device 802 to the first electronic device 801. The first electronic device 801 may display by overlapping the virtual object, the image, and/or the video transmitted from the second electronic device 802 on the first image of the operation 832.

Hereinafter, an appearance of the electronic device 101 described with reference to FIGS. 1, 2A, 2B, 3 to 5, 6A, 6B, 7A, and/or 7B is illustrated with reference to FIGS. 9A, 9B, 10A, and/or 10B. A wearable device 900 of FIGS. 9A and/or 9B and/or a wearable device 1000 of FIGS. 10A and/or 10B may be an example of the electronic device 101 of FIG. 1.

Figure 9A:
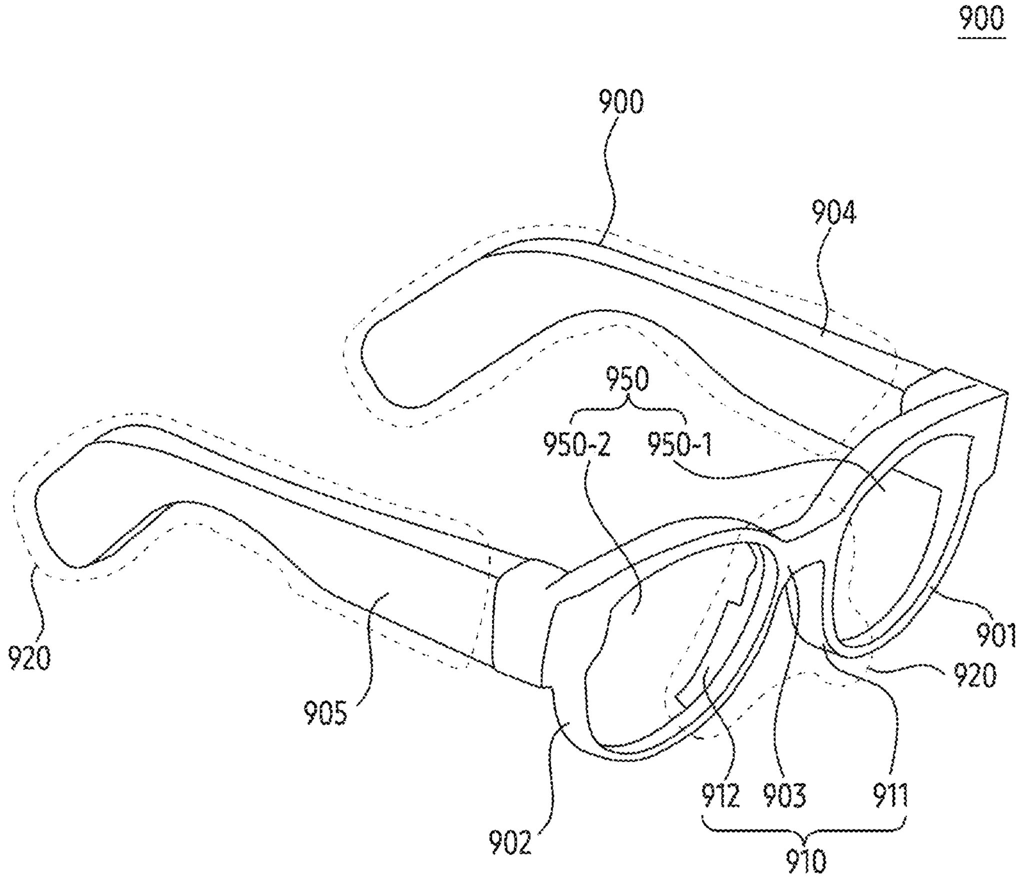
FIG. 9A illustrates an example of a perspective view of a wearable device according to an embodiment of the disclosure.

FIG. 9A illustrates an example of a perspective view of a wearable device according to an embodiment of the disclosure.

According to an embodiment, a wearable device 900 may have a form of glasses that are wearable on a user's body part (e.g., head). The wearable device 900 may include a head-mounted display (HMD). For example, a housing of the wearable device 900 may include a flexible material such as rubber and/or silicon having a form that closely adheres to a portion of the user's head (e.g., a portion of the face surrounding two eyes). For example, the housing of the wearable device 900 may include one or more straps that are able to be twined around the user's head and/or one or more temples that are attachable to the ears of the head.

Referring to FIG. 9A, according to an embodiment, the wearable device 900 may include at least one display 950 and a frame supporting the at least one display 950.

Figure 9B:
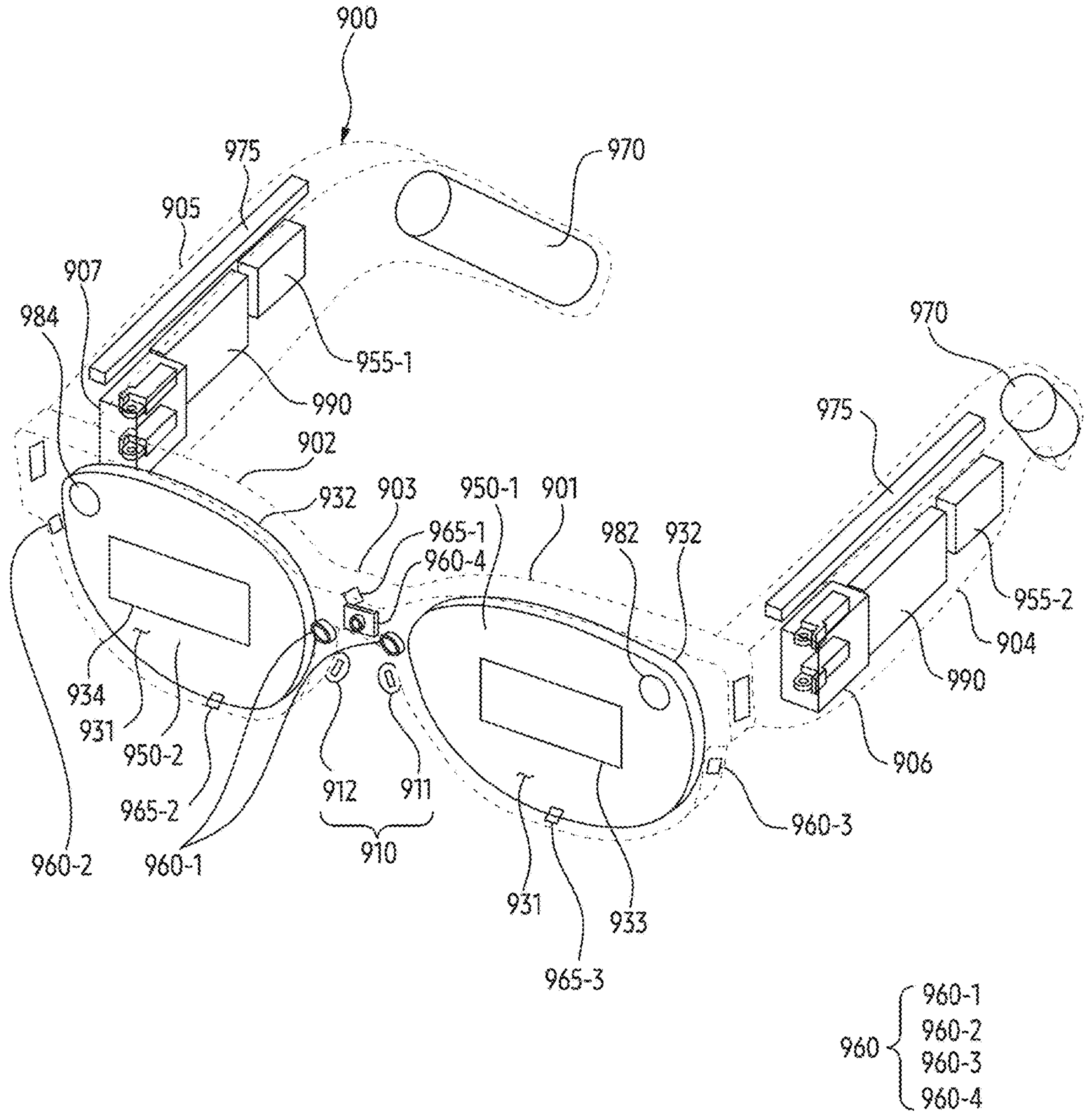
FIG. 9B illustrates an example of one or more hardware disposed in a wearable device, according to an embodiment of the disclosure.

FIG. 9B illustrates an example of one or more hardware disposed in a wearable device, according to an embodiment of the disclosure.

According to an embodiment, the wearable device 900 may be worn on a portion of the user's body. The wearable device 900 may provide augmented reality (AR), virtual reality (VR), or mixed reality (MR) in which augmented reality and virtual reality are mixed, to the user wearing the wearable device 900. For example, the wearable device 900 may display a virtual reality image provided from at least one optical device 982 and 984 of FIG. 9B on the at least one display 950, in response to a user's designated gesture obtained through a motion recognition camera 960-2 and 960-3 of FIG. 9B.

According to an embodiment, the at least one display 950 may provide visual information to the user. For example, the at least one display 950 may include a transparent or translucent lens. The at least one display 950 may include a first display 950-1 and/or a second display 950-2 spaced apart from the first display 950-1. For example, the first display 950-1 and the second display 950-2 may be disposed at locations corresponding to the user's left and right eyes, respectively.

Referring to FIG. 9B, the at least one display 950 may provide visual information transmitted from ambient light and other visual information distinct from the visual information to the user through the lens included in the at least one display 950. The lens may be formed based on at least one of a Fresnel lens, a pancake lens, or a multi-channel lens. For example, the at least one display 950 may include a first surface 931 and a second surface 932 opposite to the first surface 931. A displaying area may be formed on the second surface 932 of the at least one display 950. When the user wears the wearable device 900, the ambient light may be transmitted to the user by being incident on the first surface 931 and penetrated through the second surface 932. For another example, the at least one display 950 may display an augmented reality image in which the virtual reality image provided from the at least one optical device 982 and 984 is combined with a reality screen transmitted through the ambient light, on the displaying area formed on the second surface 932.

In an embodiment, the at least one display 950 may include at least one waveguide 933 and 934 that diffracts light transmitted from the at least one optical device 982 and 984 and transmits the diffracted light to the user. The at least one waveguide 933 and 934 may be formed based on at least one of glass, plastic, or polymer. A nano pattern may be formed on at least a portion of the outside or inside of the at least one waveguide 933 and 934. The nano pattern may be formed based on a grating structure having a shape of a polygon and/or a curved surface. Light incident to one end of the at least one waveguide 933 and 934 may be propagated to the other end of the at least one waveguide 933 and 934 by the nano pattern. The at least one waveguide 933 and 934 may include at least one of at least one diffractive element (e.g., a diffractive optical element (DOE), a holographic optical element (HOE)) and a reflective element (e.g., a reflective mirror). For example, the at least one waveguide 933 and 934 may be disposed in the wearable device 900 to guide a screen displayed by the at least one display 950 to the user's eyes. For example, the screen may be transmitted to the user's eyes based on total internal reflection (TIR) generated in the at least one waveguide 933 and 934.

The wearable device 900 may analyze an object included in a reality image collected through a photographing camera 960-4, combine a virtual object corresponding to an object that becomes a subject of augmented reality provision among the analyzed objects, and display it on the at least one display 950. The virtual object may include at least one of text and an image for various information related to the object included in the reality image. The wearable device 900 may analyze the object based on a multi-camera such as a stereo camera. For the object analysis, the wearable device 900 may execute space recognition (e.g., simultaneous localization and mapping (SLAM) by using the multi-camera and/or time-of-flight (ToF). The user wearing the wearable device 900 may watch the image displayed on the at least one display 950.

According to an embodiment, the frame may be configured with a physical structure in which the wearable device 900 may be worn on the user's body. According to an embodiment, the frame may be configured such that when the user wears the wearable device 900, the first display 950-1 and the second display 950-2 may be located at locations corresponding to the user's left and right eyes. The frame may support the at least one display 950. For example, the frame may support the first display 950-1 and the second display 950-2 to be located at locations corresponding to the user's left and right eyes.

Referring to FIG. 9A, the frame may include an area 920 at least a portion of which is in contact with the portion of the user's body, in case that the user wears the wearable device 900. For example, the area 920 in contact with the portion of the user's body of the frame may include an area in contact with a portion of a user's nose, a portion of a user's ear, and a portion of a side surface of a user's face, that the wearable device 900 contacts. According to an embodiment, the frame may include a nose pad 910 that is contacted on the portion of the user's body. When the wearable device 900 is worn by the user, the nose pad 910 may be contacted on the portion of the user's nose. The frame may include a first temple 904 and a second temple 905 that is contacted on another portion of the user's body that is distinct from the portion of the user's body.

For example, the frame may include a first rim 901 surrounding at least a portion of the first display 950-1, a second rim 902 surrounding at least a portion of the second display 950-2, a bridge 903 disposed between the first rim 901 and the second rim 902, a first pad 911 disposed along a portion of the edge of the first rim 901 from one end of the bridge 903, a second pad 912 disposed along a portion of the edge of the second rim 902 from the other end of the bridge 903, the first temple 904 extending from the first rim 901 and fixed to a portion of the wearer's ear, and the second temple 905 extending from the second rim 902 and fixed to a portion of the ear opposite to the ear. The first pad 911 and the second pad 912 may be in contact with the portion of the user's nose, and the first temple 904 and the second temple 905 may be in contact with a portion of the user's face and the portion of the user's ear. The temples 904 and 905 may be rotatably connected to the rim through hinge units 906 and 907 of FIG. 9B. The first temple 904 may be rotatably connected with respect to the first rim 901 through the first hinge unit 906 disposed between the first rim 901 and the first temple 904. The second temple 905 may be rotatably connected with respect to the second rim 902 through the second hinge unit 907 disposed between the second rim 902 and the second temple 905. According to an embodiment, the wearable device 900 may identify an external object (e.g., a user's fingertip) touching the frame and/or a gesture performed by the external object by using a touch sensor, a grip sensor, and/or a proximity sensor formed on at least a portion of a surface of the frame.

According to an embodiment, the wearable device 900 may include hardware (e.g., hardware described above based on the block diagram of FIGS. 2A and/or 2B) that performs various functions. For example, the hardware may include a battery module 970, an antenna module 975, the at least one optical device 982 and 984, speakers (e.g., speakers 955-1 and 955-2), a microphone (e.g., microphones 965-1, 965-2, and 965-3), a light emitting module, and/or a printed circuit board (PCB) 990 (e.g., a printed circuit board). Various hardware components may be disposed in the frame.

According to an embodiment, the microphone (e.g., the microphones 965-1, 965-2, and 965-3) of the wearable device 900 may obtain a sound signal, by being disposed on at least a portion of the frame. The first microphone 965-1 disposed on the bridge 903, the second microphone 965-2 disposed on the second rim 902, and the third microphone 965-3 disposed on the first rim 901 are illustrated in FIG. 9B, but the number and disposition of the microphones 965 are not limited to an embodiment of FIG. 9B. In case that the number of microphones 965 included in the wearable device 900 is two or more, the wearable device 900 may identify the direction of the sound signal by using a plurality of microphones disposed on different portions of the frame.

According to an embodiment, the at least one optical device 982 and 984 may project the virtual object to the at least one display 950, in order to provide various image information to the user. For example, the at least one optical device 982 and 984 may be a projector. The at least one optical device 982 and 984 may be disposed adjacent to the at least one display 950 or may be included in the at least one display 950 as a portion of the at least one display 950. According to an embodiment, the wearable device 900 may include a first optical device 982 corresponding to the first display 950-1 and a second optical device 984 corresponding to the second display 950-2. For example, the at least one optical device 982 and 984 may include the first optical device 982 disposed at an edge of the first display 950-1 and the second optical device 984 disposed at an edge of the second display 950-2. The first optical device 982 may transmit light to the first waveguide 933 disposed on the first display 950-1, and the second optical device 984 may transmit light to the second waveguide 934 disposed on the second display 950-2.

In an embodiment, a camera 960 may include the photographing camera 960-4, an eye tracking camera (ET CAM) 960-1, and/or the motion recognition camera 960-2 and 960-3. The photographing camera 960-4, the eye tracking camera (ET CAM) 960-1, and the motion recognition camera 960-2 and 960-3 may be disposed at different locations on the frame and may perform different functions. The eye tracking camera (ET CAM) 960-1 may output data indicating an eye location or the gaze of the user wearing the wearable device 900. For example, the wearable device 900 may detect the gaze from an image including a user's pupil obtained through the eye tracking camera (ET CAM) 960-1.

The wearable device 900 may identify an object (e.g., a real object, and/or a virtual object) focused by the user by using the user's gaze obtained through the eye tracking camera (ET CAM) 960-1. The wearable device 900 that identified the focused object may execute a function (e.g., gaze interaction) for interaction between the user and the focused object. The wearable device 900 may represent a portion corresponding to the eye of the avatar indicating the user in the virtual space by using the user's gaze obtained through the eye tracking camera (ET CAM) 960-1. The wearable device 900 may render an image (or screen) displayed on the at least one display 950 based on the location of the user's eye.

For example, visual quality of a first area related to the gaze in the image and visual quality (e.g., resolution, brightness, saturation, grayscale, and pixels per inch (PPI)) of a second area distinct from the first area may be different from each other. The wearable device 900 may obtain an image having the visual quality of the first area and the visual quality of the second area matching the user's gaze by using foveated rendering. For example, in case that the wearable device 900 supports an iris recognition function, user authentication may be performed based on iris information obtained using the eye tracking camera (ET CAM) 960-1. An example in which the eye tracking camera (ET CAM) 960-1 is disposed toward the user's right eye is illustrated in FIG. 9B, but the embodiment is not limited thereto, and the eye tracking camera (ET CAM) 960-1 may be disposed alone toward the user's left eye, or may be disposed toward both eyes.

In an embodiment, the photographing camera 960-4 may photograph a real image or background to be matched with a virtual image in order to implement the augmented reality or mixed reality content. The photographing camera 960-4 may be used to obtain an image having a high resolution based on a high resolution (HR) or a photo video (PV). The photographing camera 960-4 may photograph an image of a specific object existing at a location viewed by the user and may provide the image to the at least one display 950. The at least one display 950 may display one image in which a virtual image provided through the at least one optical device 982 and 984 is overlapped with information on the real image or background including an image of the specific object obtained by using the photographing camera 960-4. The wearable device 900 may compensate for depth information (e.g., a distance between the wearable device 900 and an external object obtained through a depth sensor) by using an image obtained through the photographing camera 960-4. The wearable device 900 may perform object recognition through the image obtained using the photographing camera 960-4. The wearable device 900 may perform a function (e.g., auto focus) of focusing on an object (or subject) in the image by using the photographing camera 960-4 and/or an optical image stabilization (OIS) function (e.g., an anti-shaking function). The wearable device 900 may perform a pass-through function for displaying an image obtained through the photographing camera 960-4 overlapping at least a portion of the screen, while displaying a screen indicating the virtual space on the at least one display 950. In an embodiment, the photographing camera 960-4 may be disposed on the bridge 903 disposed between the first rim 901 and the second rim 902.

The eye tracking camera (ET CAM) 960-1 may implement a more realistic augmented reality by matching the user's gaze with the visual information provided on the at least one display 950 by tracking the gaze of the user wearing the wearable device 900. For example, when the user looks at the front, the wearable device 900 may naturally display environment information related to the user's front on the at least one display 950 at the place where the user is located. The eye tracking camera (ET CAM) 960-1 may be configured to capture an image of the user's pupil in order to determine the user's gaze. For example, the eye tracking camera (ET CAM) 960-1 may receive gaze detection light reflected from the user's pupil and may track the user's gaze based on the location and movement of the received gaze detection light. In an embodiment, the eye tracking camera (ET CAM) 960-1 may be disposed at a location corresponding to the user's left and right eyes. For example, the eye tracking camera (ET CAM) 960-1 may be disposed in the first rim 901 and/or the second rim 902 to face the direction in which the user wearing the wearable device 900 is located.

The motion recognition camera 960-2 and 960-3 may provide a specific event to the screen provided on the at least one display 950 by recognizing the movement of the whole or portion of the user's body, such as the user's torso, hand, or face and the like. The motion recognition camera 960-2 and 960-3 may obtain a signal corresponding to the gesture by recognizing the user's gesture (gesture recognition), and may provide a display corresponding to the signal to the at least one display 950. The processor may identify a signal corresponding to the gesture and may perform a designated function based on the identification. The motion recognition camera 960-2 and 960-3 may be used to perform a space recognition function using SLAM and/or a depth map for 6 degrees of freedom pose (6 dof pose). The processor may perform a gesture recognition function and/or an object tracking function by using the motion recognition camera 960-2 and 960-3. In an embodiment, the motion recognition camera 960-2 and 960-3 may be disposed on the first rim 901and/or the second rim 902.

The camera 960 included in the wearable device 900 is not limited to the above-described eye tracking camera (ET CAM) 960-1 and the motion recognition camera 960-2 and 960-3. For example, the wearable device 900 may identify an external object included in the FoV by using the camera disposed toward the user's FoV. That the wearable device 900 identifies the external object may be performed based on a sensor for identifying a distance between the wearable device 900 and the external object, such as a depth sensor and/or a time of flight (ToF) sensor. The camera 960 disposed toward the FoV may support an autofocus function and/or an optical image stabilization (OIS) function. For example, the wearable device 900 may include the camera 960 (e.g., a face tracking (FT) camera) disposed toward the face in order to obtain an image including the face of the user wearing the wearable device 900.

Although not illustrated, according to an embodiment, the wearable device 900 may further include a light source (e.g., LED) that emits light toward a subject (e.g., the user's eyes, face, and/or the external object in the FoV) photographed by using the camera 960. The light source may include an LED having an infrared wavelength. The light source may be disposed on at least one of the frame, and the hinge units 906 and 907.

According to an embodiment, the battery module 970 may supply power to electronic components of the wearable device 900. In an embodiment, the battery module 970 may be disposed in the first temple 904 and/or the second temple 905. For example, the battery module 970 may be a plurality of battery modules 970. The plurality of battery modules 970, respectively, may be disposed on each of the first temple 904 and the second temple 905. In an embodiment, the battery module 970 may be disposed at an end of the first temple 904 and/or the second temple 905.

The antenna module 975 may transmit the signal or power to the outside of the wearable device 900 or may receive the signal or power from the outside. In an embodiment, the antenna module 975 may be disposed in the first temple 904 and/or the second temple 905. For example, the antenna module 975 may be disposed close to one surface of the first temple 904 and/or the second temple 905.

The speaker 955 may output a sound signal to the outside of the wearable device 900. A sound output module may be referred to as a speaker. In an embodiment, the speaker 955 may be disposed in the first temple 904 and/or the second temple 905 in order to be disposed adjacent to the ear of the user wearing the wearable device 900. For example, the speaker 955 may include the second speaker 955-2 disposed adjacent to the user's left ear by being disposed in the first temple 904, and the first speaker 955-1 disposed adjacent to the user's right ear by being disposed in the second temple 905.

The light emitting module (not illustrated) may include at least one light emitting element. The light emitting module may emit light of a color corresponding to a specific state or may emit light in an operation corresponding to the specific state in order to visually provide information on a specific state of the wearable device 900 to the user. For example, in case that the wearable device 900 needs charging, it may emit light which is red light at regular intervals. In an embodiment, the light emitting module may be disposed on the first rim 901 and/or the second rim 902.

Referring to FIG. 9B, according to an embodiment, the wearable device 900 may include the printed circuit board (PCB) 990. The PCB 990 may be included in at least one of the first temple 904 or the second temple 905. The PCB 990 may include an interposer disposed between at least two sub PCBs. On the PCB 990, one or more hardware (e.g., hardware illustrated by different blocks of FIGS. 2A and/or 2B) included in the wearable device 900 may be disposed. The wearable device 900 may include a flexible PCB (FPCB) for interconnecting the hardware.

According to an embodiment, the wearable device 900 may include at least one of a gyro sensor, a gravity sensor, and/or an acceleration sensor for detecting the posture of the wearable device 900 and/or the posture of a body part (e.g., a head) of the user wearing the wearable device 900. Each of the gravity sensor and the acceleration sensor may measure gravity acceleration, and/or acceleration based on designated 3 dimensional axes (e.g., x-axis, y-axis, and z-axis) perpendicular to each other. The gyro sensor may measure angular velocity of each of designated 3 dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 900 may identify the user's motion and/or gesture performed to execute or stop a specific function of the wearable device 900 based on the IMU.

Figure 10A:
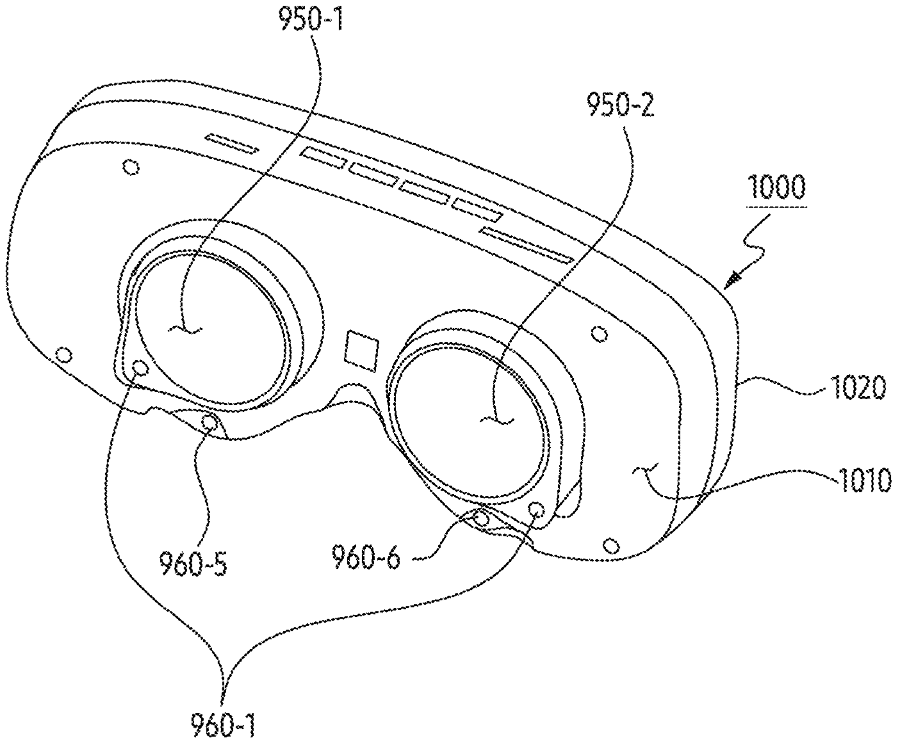
FIGS. 10A and 10B illustrate an example of exterior of a wearable device according to various embodiments of the disclosure.
Figure 10B:
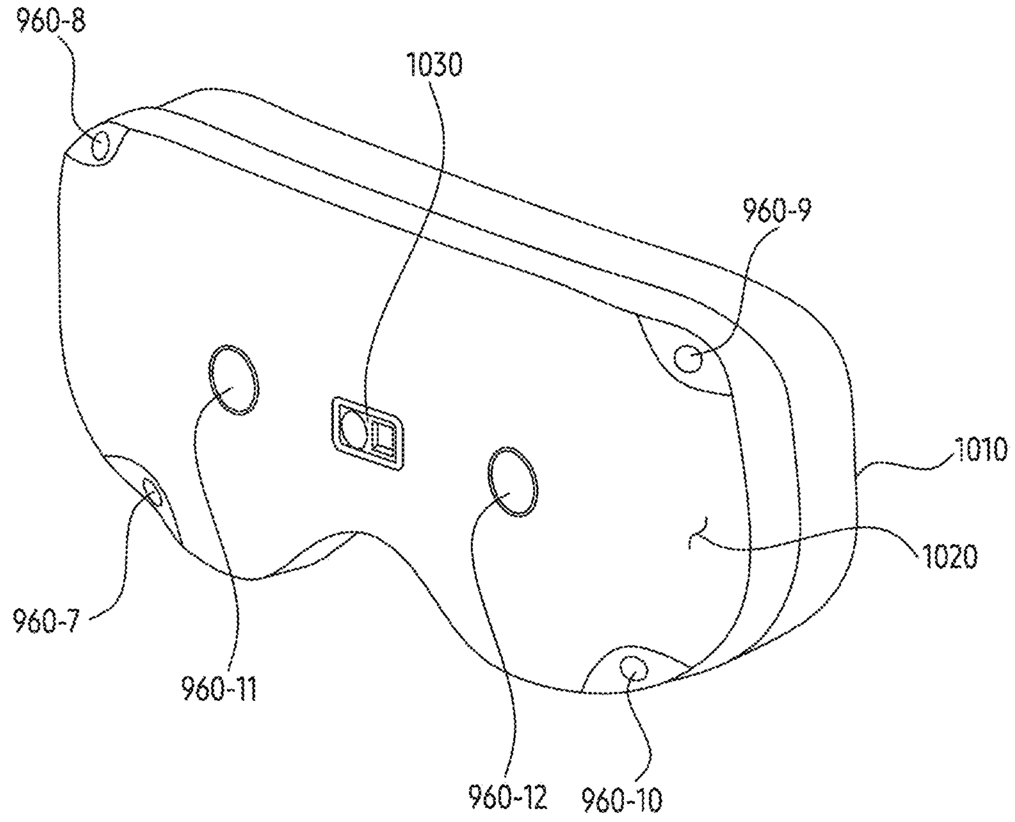

FIGS. 10A and 10B illustrate an example of exterior of a wearable device according to various embodiments of the disclosure.

A wearable device 1000 of FIGS. 10A and 10B may include at least a portion of the hardware of a wearable device 900 described with reference to FIGS. 9A and/or 9B. According to an embodiment, an example of exterior of a first surface 1010 of a housing of the wearable device 1000 may be illustrated in FIG. 10A, and an example of exterior of a second surface 1020 opposite to the first surface 1010 may be illustrated in FIG. 10B.

Referring to FIG. 10A, according to an embodiment, the first surface 1010 of the wearable device 1000 may have an attachable form on a user's body part (e.g., the user's face). Although not illustrated, the wearable device 1000 may further include a strap for fixing on the user's body part and/or one or more temples (e.g., a first temple 904 and/or a second temple 905 of FIGS. 9A and 9B). A first display 950-1 for outputting an image to a left eye among both eyes of the user and a second display 950-2 for outputting an image to a right eye among both eyes may be disposed on the first surface 1010. The wearable device 1000 may further include rubber or silicon packing, which are formed on the first surface 1010 and for preventing interference by light (e.g., ambient light) different from the light emitted from the first display 950-1 and the second display 950-2.

According to an embodiment, the wearable device 1000 may include cameras 960-1 for photographing and/or tracking both eyes of the user adjacent to each of the first display 950-1 and the second display 950-2. The cameras 960-1 may be referred to an eye tracking camera 960-1 of FIG. 9B. According to an embodiment, the wearable device 1000 may include cameras 960-5 and 960-6 for photographing and/or recognizing the user's face. The cameras 960-5 and 960-6 may be referred to as FT cameras. The wearable device 1000 may control an avatar representing the user in the virtual space based on a motion of the user's face identified using the cameras 960-5 and 960-6. For example, the wearable device 1000 may change a texture and/or shape of a portion of the avatar (e.g., a portion of an avatar representing a person's face), by using information obtained by cameras 960-5 and 960-6 (e.g., FT camera) and representing facial expression of a user wearing the wearable device 1000.

Referring to FIG. 10B, a camera (e.g., cameras 960-7, 960-8, 960-9, 960-10, 960-11, and 960-12)) for obtaining information related to an external environment of the wearable device 1000, and/or a sensor (e.g., a depth sensor 1030) may be disposed on the second surface 1020 opposite to the first surface 1010 of FIG. 10A. For example, the cameras 960-7, 960-8, 960-9, and 960-10 may be disposed on the second surface 1020 to recognize an external object. The cameras 960-7, 960-8, 960-9, and 960-10 of FIG. 10B may correspond to the motion recognition camera 960-2 and 960-3 of FIG. 9B.

For example, using cameras 960-11 and 960-12, the wearable device 1000 may obtain an image and/or video to be transmitted to each of both eyes of the user. The camera 960-11 may be disposed on the second surface 1020 of the wearable device 1000 to obtain an image to be displayed through the second display 950-2 corresponding to the right eye among above both eyes. The camera 960-12 may be disposed on the second surface 1020 of the wearable device 1000 to obtain an image to be displayed through the first display 950-1 corresponding to the left eye among above both eyes. The cameras 960- 11 and 960-12 may correspond to the photographing camera 960-4 of FIG. 9B.

According to an embodiment, the wearable device 1000 may include the depth sensor 1030 disposed on the second surface 1020 to identify the distance between the wearable device 1000 and the external object. Using the depth sensor 1030, the wearable device 1000 may obtain spatial information (e.g., a depth map) for at least a portion of the FoV of the user wearing the wearable device 1000. Although not illustrated, a microphone for obtaining sound outputted from the external object may be disposed on the second surface 1020 of the wearable device 1000. The number of microphones may be one or more according to the embodiment.

Metaverse is a combination of the English words 'Meta', which means 'virtual' and 'transcendence', and 'Universe', which means space, and refers to a 3 dimensional virtual world in which social, economic, and cultural activities such as the real world take place. The metaverse is a more advanced concept than virtual reality (VR, state-of-the-art technology that allows people to experience real life in a virtual world created by computers), and it is characterized by using avatars to not only enjoy games or virtual reality, but also engage in social and cultural activities such as real reality. Based on augmented reality (AR), virtual reality environment (VR), mixed environment (MR), and/or extended reality (XR), the metaverse service may provide media content to enhance immersion in the virtual world.

For example, media content provided by the metaverse service may include social interaction content that includes an avatar-based game, concert, party, and/or meeting. For example, the media content may include information for an economic activity such as advertising, user created content, and/or the sale and/or shopping of productions. Ownership of the user created content may be proved by a blockchain-based non-fungible token (NFT). The metaverse service may support an economic activity based on real money and/or cryptocurrency. By the metaverse service, virtual content linked to the real world, such as digital twin or life logging, may be provided.

Figure 11:
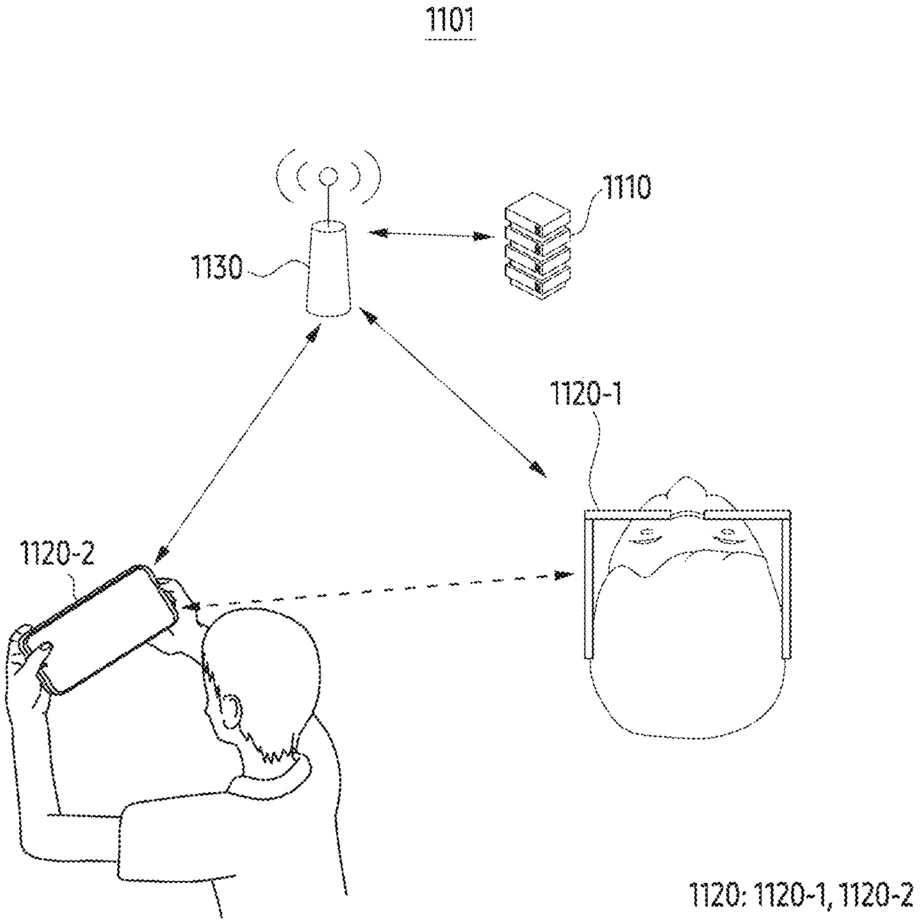
FIG. 11 is a diagram of a network environment related to a metaverse service according to an embodiment of the disclosure.

FIG. 11 is a diagram of a network environment 1101 receiving a metaverse service through a server 1110 according to an embodiment of the disclosure.

Referring to FIG. 11, the network environment 1101 may include a server 1110, a user terminal 1120 (e.g., a first terminal 1120-1 and a second terminal 1120-2), and a network connecting the server 1110 and the user terminal 1120. In the network environment 1101, the server 1110 may provide the metaverse service to the user terminal 1120. The network may be formed by at least one intermediate node 1130 including an access point (AP) and/or a base station. The user terminal 1120 may output a user interface (UI) related to the metaverse service to the user of the user terminal 1120, by accessing the server 1110 through the network. Based on the UI, the user terminal 1120 may obtain information to be inputted into the metaverse service from the user, or may output information (e.g., multimedia content) related to the metaverse service to the user.

In this case, the server 1110 provides a virtual space so that the user terminal 1120 may perform an activity in the virtual space. In addition, the user terminal 1120 expresses information provided by the server 1110 to the user or transmits information that the user wants to express in the virtual space to the server, by installing an S/W agent for accessing the virtual space provided by the server 1110. The S/W agent may be provided directly through the server 1110, downloaded from a public server, or provided by being embedded when purchasing the terminal.

In an embodiment, the metaverse service may be provided to the user terminal 1120 and/or the user using the server 1110. The embodiment is not limited thereto, and the metaverse service may be provided through individual contact between users. For example, in the network environment 1101, the metaverse service may be provided by a direct connection between the first terminal 1120-1 and the second terminal 1120-2 independently of the server 1110. Referring to FIG. 11, in the network environment 1101, the first terminal 1120-1 and the second terminal 1120-2 may be connected to each other through a network formed by at least one intermediate node 1130. In an embodiment in which the first terminal 1120-1 and the second terminal 1120-2 are directly connected, any one user terminal among the first terminal 1120-1 and the second terminal 1120-2 may perform a role of the server 1110. For example, a metaverse environment may be configured only by a device-to-device connection (e.g., a peer-to-peer (P2P) connection).

In an embodiment, the user terminal 1120 (or the user terminal 1120 including the first terminal 1120-1 and the second terminal 1120-2) may be made of various form factors, and is characterized in that it include an output device providing an image or/and sound to the user and an input device for inputting information into the metaverse service. For example, various form factors of the user terminal 1120 may include a smartphone (e.g., the second terminal 1120-2), an AR device (e.g., the first terminal 1120-1), a VR device, an MR device, a Video See Through (VST) device, an Optical See Through (OST) device, a smart lens, a smart mirror, a television (TV) or projector capable of input and output.

The network (e.g., the network formed by at least one intermediate node 1130) includes all of various broadband networks including third generation (3G), fourth generation (4G), and fifth generation (5G), and short-range networks (e.g., a wired network or wireless network directly connecting the first terminal 1120-1 and the second terminal 1120-2) including WiFi and BT. The user terminal 1120 of FIG. 11 may include the HMD device 101 described with reference to FIGS. 1, 2A, 2B, 3 to 5, 6A, 6B, 7A, and/or 7B.

In an embodiment, a method of displaying a screen including appearance of a body part (e.g., a user's face) covered by a wearable device such as an HMD device may be required. As described above, according to an embodiment, a head-mounted display (HMD) device (e.g., a HMD device 101 of FIGS. 1, 2A, 2B, 3 to 5, 6A, 6B, 7A, and/or 7B, a first HMD device 801 and/or a second HMD device 802 of FIG. 8) may comprise a camera (e.g., a camera 225 of FIGS. 2A and/or 2B), a communication circuit (e.g., a communication circuit 235 of FIGS. 2A and/or 2B), at least one display (e.g., a display 220 of FIGS. 2A and/or 2B), memory storing one or more computer programs, and one or more processors (e.g., a processor 210 of FIGS. 2A and/or 2B). The one or more computer programs may include computer-executable instructions that, when executed by the one or more processors individually or collectively, cause the HMD device to control the camera to obtain a first image (e.g., an image 410 of FIGS. 4, 5, 6A, and 6B) outside of the HMD device. The one or more computer programs may include computer-executable instructions that, when executed by the one or more processors individually or collectively, cause the HMD device to detect a portion (e.g., a portion 142 of FIG. 1) of the first image corresponding to an external HMD device (e.g., an external HMD device 120 of FIGS. 1, 2A, 2B, 3 to 5, 6A, 6B, 7A, and/or 7B). The one or more computer programs may include computer-executable instructions that, when executed by the one or more processors individually or collectively, cause the HMD device to receive, from the external HMD device through the communication circuit, information (e.g., information 150 of FIG. 1) with respect to a body part covered by the external HMD device. The one or more computer programs may include computer-executable instructions that, when executed by the one or more processors individually or collectively, cause the HMD device to obtain, by performing a rendering with respect to the body part based on the information, a second image representing the body part. The one or more computer programs may include computer-executable instructions that, when executed by the one or more processors individually or collectively, cause the HMD device to display, via the at least one display, a composite image including the first image and the second image, wherein the second image is positioned at the portion of the first image. According to an embodiment, the HMD device may display an image and/or video representing the appearance of a body part covered by an external HMD device.

For example, the one or more computer programs further include computer-executable instructions that, when executed by the one or more processors individually or collectively, cause the HMD device to generate the composite image by overlapping the second image on the portion of the first image.

For example, the one or more computer programs further include computer-executable instructions that, when executed by the one or more processors individually or collectively, cause the HMD device to detect, based on whether a direction of the external HMD device is towards the HMD device that is determined by using the first image, an interaction between the HMD device and the external HMD device.

For example, the one or more computer programs further include computer-executable instructions that, when executed by the one or more processors individually or collectively, cause the HMD device to detect, based on a communication link established between the HMD device and the external HMD device, an interaction between the HMD device and the external HMD device.

For example, the one or more computer programs further include computer-executable instructions that, when executed by the one or more processors individually or collectively, cause the HMD device to obtain, by performing rendering based on a direction of gaze indicated by the information, the second image representing eyes of a user wearing the external HMD device. The information with respect to the body part may indicate a direction of the eyes of the user wearing the external HMD device.

For example, the one or more computer programs further include computer-executable instructions that, when executed by the one or more processors individually or collectively, cause the HMD device to obtain, by inputting the information and the first image to a neural network for the rendering, the second image.

For example, the one or more computer programs further include computer-executable instructions that, when executed by the one or more processors individually or collectively, cause the HMD device to change, in a three-dimensional mesh that is received from the external HMD device through the communication circuit, a portion of the three-dimensional mesh corresponding to the body part based on the information.

For example, the one or more computer programs further include computer-executable instructions that, when executed by the one or more processors individually or collectively, cause the HMD device to determine, based on at least one of a distance from the external HMD device or a direction of the external HMD device with respect to the HMD device, a size of the second image.

For example, the one or more computer programs further include computer-executable instructions that, when executed by the one or more processors individually or collectively, cause the HMD device to obtain the first image by controlling the camera by using a period based on at least one of a distance from the external HMD device or a direction of the external HMD device with respect to the HMD device.

For example, the one or more computer programs further include computer-executable instructions that, when executed by the one or more processors individually or collectively, cause the HMD device to change, based on at least one of a distance from the external HMD device or a direction of the external HMD device with respect to the HMD device, a period for receiving the information from the external HMD device.

For example, the HMD device may include a second camera communicatively coupled to the one or more processors. The information with respect to the body part may be a first information. The one or more computer programs further include computer-executable instructions that, when executed by the one or more processors individually or collectively, cause the HMD device to obtain, based on a third image of the second camera, a second information (e.g., a direction of gaze of the user wearing the HMD device) with respect to a body part of a user wearing the HMD device. The one or more computer programs further include computer-executable instructions that, when executed by the one or more processors individually or collectively, cause the HMD device to transmit, to the external HMD device through the communication circuit, the second information.

As described above, according to an embodiment, a method performed by a head-mounted display (HMD) device comprising a camera, a communication circuit, at least one display and one or more processors is provided. The method may comprise controlling the camera to obtain a first image outside of the HMD device. The method may comprise detecting a portion of the first image corresponding to an external HMD device. The method may comprise receiving, from the external HMD device through the communication circuit, information with respect to a body part covered by the external HMD device. The method may comprise obtaining, by performing a rendering with respect to the body part based on the information, a second image representing the body part. The method may comprise displaying, via the at least one display, a composite image including the first image and the second image, wherein the second image is positioned on the portion of the first image.

For example, the method may include generating the composite image by overlapping the second image on the portion of the first image.

For example, the controlling of the camera may include detecting, based on whether a direction of the external HMD device is towards the HMD device that is determined by using the first image, an interaction between the HMD device and the external HMD device.

For example, the controlling of the camera may include detecting, based on a communication link established between the HMD device and the external HMD device, an interaction between the HMD device and the external HMD device.

For example, the obtaining of the second image may include obtaining, by performing rendering based on a direction of gaze indicated by the information, the second image representing eyes of a user wearing the external HMD device. The information with respect to the body part may indicate a direction of the eyes of the user wearing the external HMD device.

For example, the obtaining of the second image may include obtaining, by inputting the information and the first image to a neural network for the rendering, the second image.

For example, the obtaining of the second image may include changing, in a three-dimensional mesh that is received from the external HMD device through the communication circuit, a portion of the three-dimensional mesh corresponding to the body part based on the information.

For example, the obtaining of the second image may include determining, based on at least one of a distance from the external HMD device or a direction of the external HMD device with respect to the HMD device, a size of the second image.

For example, the controlling may include obtaining the first image by controlling the camera by using a period based on at least one of a distance from the external HMD device or a direction of the external HMD device with respect to the HMD device.

For example, the receiving may include changing, based on at least one of a distance from the external HMD device or a direction of the external HMD device with respect to the HMD device, a period for receiving the information from the external HMD device.

For example, the method may include obtaining, based on a third image of the second camera of the HMD device, a second information (e.g., a direction of gaze of the user wearing the HMD device) with respect to a body part of a user wearing the HMD device. The method may comprise transmitting, to the external HMD device through the communication circuit, the second information.

As described above, according to an embodiment, an electronic device may comprise a camera, a communication circuit, at least one display, and a processor. The processor may be configured to detect, in a video obtained through the camera, a portion corresponding to a head-mounted display (HMD) device. The processor may be configured to obtain, based on information received from the HMD device through the communication circuit, a virtual object representing a body part covered by the HMD device. The processor may be configured to display, while displaying the video on the at least one display, at least portion of the virtual object on at least portion of the at least one display where the detected portion is displayed.

For example, the processor may be configured to display at least a portion of the virtual object based on detecting the interaction between the electronic device and the HMD device while displaying the video on the at least one display based on a video-see through (VST).

For example, the processor may be configured to display the at least a portion in which eyes having a direction indicated by the information are disposed, on the at least one display, in the virtual object representing the head wearing the HMD device.

As described above, according to an embodiment, a method of an electronic device comprising a camera, a communication circuit, at least one display and a processor, may comprise detecting, in a video obtained through the camera, a portion corresponding to a head-mounted display (HMD) device. The method may comprise obtaining, based on information received from the HMD device through the communication circuit, a virtual object representing a body part covered by the HMD device. The method may comprise displaying, while displaying the video on the at least one display, at least portion of the virtual object on at least portion of the at least one display where the detected portion is displayed.

For example, the displaying may comprise displaying at least a portion of the virtual object based on detecting the interaction between the electronic device and the HMD device while displaying the video on the at least one display based on a video-see through (VST).

For example, the displaying may comprise displaying the at least a portion in which eyes having a direction indicated by the information are disposed, on the at least one display, in the virtual object representing the head wearing the HMD device.

As described above, according to an embodiment, a non-transitory computer-readable storage medium may include instructions. The instructions, when executed by the processor of the electronic device, may cause the electronic device to perform the operation of the electronic device and/or the HMD device described above.

The device and component described in the disclosure may be implemented by using one or more general purpose computers or special purpose computers, such as a processor, controller, arithmetic logic unit (ALU), digital signal processor, microcomputer, field programmable gate array (FPGA), programmable logic unit (PLU), microprocessor, or any other device capable of executing and responding to instructions. The processing device may perform an operating system (OS) and one or more software applications executed on the operating system. In addition, the processing device may access, store, manipulate, process, and generate data in response to the execution of the software. For convenience of understanding, there is a case that one processing device is described as being used, but a person who has ordinary knowledge in the relevant technical field may see that the processing device may include a plurality of processing elements and/or a plurality of types of processing elements. For example, the processing device may include a plurality of processors or one processor and one controller. In addition, another processing configuration, such as a parallel processor, is also possible.

The software may include a computer program, code, instruction, or a combination of one or more thereof, and may configure the processing device to operate as desired or may command the processing device independently or collectively. The software and/or data may be embodied in any type of machine, component, physical device, computer storage medium, or device, to be interpreted by the processing device or to provide commands or data to the processing device. The software may be distributed on network-connected computer systems and stored or executed in a distributed manner. The software and data may be stored in one or more computer-readable recording medium.

The method according to the embodiment may be implemented in the form of a program command that may be performed through various computer means and recorded on a computer-readable medium. In this case, the medium may continuously store a program executable by the computer or may temporarily store the program for execution or download. In addition, the medium may be various recording means or storage means in the form of a single or a combination of several hardware, but is not limited to a medium directly connected to a certain computer system, and may exist distributed on the network. Examples of media may include may be those configured to store program instructions, including a magnetic medium such as a hard disk, floppy disk, and magnetic tape, optical recording medium such as a compact disc read only memory (CD-ROM) and digital versatile disc (DVD), magneto-optical medium, such as a floptical disk, and ROM, RAM, flash memory, and the like. In addition, examples of other media may include recording media or storage media managed by app stores that distribute applications, sites that supply or distribute various software, servers, and the like.

As described above, although the embodiments have been described with limited examples and drawings, a person who has ordinary knowledge in the relevant technical field is capable of various modifications and transform from the above description. For example, even if the described technologies are performed in a different order from the described method, and/or the components of the described system, structure, device, circuit, and the like are coupled or combined in a different form from the described method, or replaced or substituted by other components or equivalents, appropriate a result may be achieved.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. A head-mounted display (HMD) device, comprising:

a camera;

a communication circuit;

at least one display;

memory storing one or more computer programs; and one or more processors communicatively coupled to the camera, the communication circuit, the at least one display, and the memory, wherein the one or more computer programs include computer-executable instructions that, when executed by the one or more processors individually or collectively, cause the HMD device to:

control the camera to obtain a first image outside of the HMD device, detect a portion of the first image corresponding to an external HMD device, receive, from the external HMD device through the communication circuit, information with respect to a body part covered by the external HMD device, obtain, by performing a rendering with respect to the body part based on the information, a second image representing the body part, and display, via the at least one display, a composite image including the first image and the second image, wherein the second image is positioned at the portion of the first image.

2. The HMD device of claim 1, wherein the one or more computer programs further include computer-executable instructions that, when executed by the one or more processors individually or collectively, cause the HMD device to:

generate the composite image by overlapping the second image on the portion of the first image.

3. The HMD device of claim 1, wherein the one or more computer programs further include computer-executable instructions that, when executed by the one or more processors individually or collectively, cause the HMD device to:

detect, based on whether a direction of the external HMD device is towards the HMD device that is determined by using the first image, an interaction between the HMD device and the external HMD device.

4. The HMD device of claim 1, wherein the one or more computer programs further include computer-executable instructions that, when executed by the one or more processors individually or collectively, cause the HMD device to:

detect, based on a communication link established between the HMD device and the external HMD device, an interaction between the HMD device and the external HMD device.

5. The HMD device of claim 1, wherein the one or more computer programs further include computer- executable instructions that, when executed by the one or more processors individually or collectively, cause the HMD device to:

obtain, by performing rendering based on a direction of gaze indicated by the information, the second image representing eyes of a user wearing the external HMD device, and wherein the information with respect to the body part indicates a direction of the eyes of the user wearing the external HMD device.

6. The HMD device of claim 1, wherein the one or more computer programs further include computer-executable instructions that, when executed by the one or more processors individually or collectively, cause the HMD device to:

obtain, by inputting the information and the first image to a neural network for the rendering, the second image.

7. The HMD device of claim 1, wherein the one or more computer programs further include computer-executable instructions that, when executed by the one or more processors individually or collectively, cause the HMD device to:

change, in a three-dimensional mesh that is received from the external HMD device through the communication circuit, a portion of the three-dimensional mesh corresponding to the body part based on the information.

8. The HMD device of claim 1, wherein the one or more computer programs further include computer-executable instructions that, when executed by the one or more processors individually or collectively, cause the HMD device to:

determine, based on at least one of a distance from the external HMD device or a direction of the external HMD device with respect to the HMD device, a size of the second image.

9. The HMD device of claim 1, wherein the one or more computer programs further include computer-executable instructions that, when executed by the one or more processors individually or collectively, cause the HMD device to:

obtain the first image by controlling the camera by using a period based on at least one of a distance from the external HMD device or a direction of the external HMD device with respect to the HMD device.

10. The HMD device of claim 1, wherein the one or more computer programs further include computer-executable instructions that, when executed by the one or more processors individually or collectively, cause the HMD device to:

change, based on at least one of a distance from the external HMD device or a direction of the external HMD device with respect to the HMD device, a period for receiving the information from the external HMD device.

11. The HMD device of claim 1, further comprising:

a second camera communicatively coupled to the one or more processors, wherein the information with respect to the body part is a first information, and wherein the one or more computer programs further include computer- executable instructions that, when executed by the one or more processors individually or collectively, cause the HMD device to:

obtain, based on a third image of the second camera, a second information with respect to a body part of a user wearing the HMD device, and transmit, to the external HMD device through the communication circuit, the second information.

12. A method performed by a head-mounted display (HMD) device comprising a camera, a communication circuit, at least one display and one or more processors, the method comprising:

controlling, by the HMD device, the camera to obtain a first image outside of the HMD device;

detecting, by the HMD device, a portion of the first image corresponding to an external HMD device;

receiving, by the HMD device from the external HMD device through the communication circuit, information with respect to a body part covered by the external HMD device;

obtaining, by the HMD device by performing a rendering with respect to the body part based on the information, a second image representing the body part; and displaying, by the HMD device via the at least one display, a composite image including the first image and the second image, wherein the second image is positioned on the portion of the first image.

13. The method of claim 12, further comprising:

generating the composite image by overlapping the second image on the portion of the first image.

14. The method of claim 12, wherein the controlling of the camera comprises:

detecting, based on whether a direction of the external HMD device is towards the HMD device that is determined by using the first image, an interaction between the HMD device and the external HMD device.

15. The method of claim 12, wherein the controlling of the camera comprises:

detecting, based on a communication link established between the HMD device and the external HMD device, an interaction between the HMD device and the external HMD device.

16. The method of claim 12, wherein the obtaining of the second image comprises:

obtaining, by performing rendering based on a direction of gaze indicated by the information, the second image representing eyes of a user wearing the external HMD device, and wherein the information with respect to the body part indicates a direction of the eyes of the user wearing the external HMD device.

17. The method of claim 12, wherein the obtaining of the second image comprises:

obtaining, by inputting the information and the first image to a neural network for the rendering, the second image.

18. The method of claim 12, wherein the obtaining of the second image comprises:

changing, in a three-dimensional mesh that is received from the external HMD device through the communication circuit, a portion of the three-dimensional mesh corresponding to the body part based on the information.

19. The method of claim 12, wherein the obtaining of the second image comprises:

determining, based on at least one of a distance from the external HMD device or a direction of the external HMD device with respect to the HMD device, a size of the second image.

20. An electronic device, comprising:

a camera;

a communication circuit;

at least one display;

memory storing one or more computer programs; and one or more processors communicatively coupled to the camera, the communication circuit, the at least one display, and the memory, wherein the one or more computer programs include computer-executable instructions that, when executed by the one or more processors individually or collectively, cause the electronic device to:

detect, in a video obtained through the camera, a portion corresponding to a head-mounted display (HMD) device external to the electronic device, receive, from the HMD device through the communication circuit, information regarding a body part covered by the HMD device, obtain, based on the information, a virtual object representing the body part covered by the HMD device, and display, on the at least one display, a composite video including the video obtained through the camera and at least a portion of the virtual object on a portion of the at least one display where the detected portion is displayed.

* * * * *